United States Patent
Perla

(10) Patent No.: US 7,435,891 B2
(45) Date of Patent: Oct. 14, 2008

(54) METHOD AND SYSTEM FOR GENERATING MUSICAL VARIATIONS DIRECTED TO PARTICULAR SKILL-LEVELS

(76) Inventor: James C. Perla, 77 Dow Pl., 506, San Francisco, CA (US) 94107

( * ) Notice: Subject to any disclaimer, the term of this patent is extended or adjusted under 35 U.S.C. 154(b) by 0 days.

(21) Appl. No.: 11/498,623

(22) Filed: Aug. 3, 2006

(65) Prior Publication Data
US 2007/0022866 A1 Feb. 1, 2007

Related U.S. Application Data

(63) Continuation-in-part of application No. 10/858,821, filed on Jun. 1, 2004, now abandoned.

(60) Provisional application No. 60/548,927, filed on Mar. 1, 2004, provisional application No. 60/475,214, filed on May 30, 2003.

(51) Int. Cl.
*G09B 15/00* (2006.01)
*G09B 15/02* (2006.01)
*G10H 7/00* (2006.01)

(52) U.S. Cl. .............. 84/470 R; 84/477 R; 84/609; 84/610; 84/612; 84/613; 84/619; 84/723; 434/307 R

(58) Field of Classification Search ............... 84/470 R, 84/619, 477 R, 609, 723, 610–613; 434/307 R
See application file for complete search history.

(56) References Cited

U.S. PATENT DOCUMENTS

| | | | | |
|---|---|---|---|---|
| 3,744,368 A | * | 7/1973 | Lady | 84/470 R |
| 5,270,475 A | * | 12/1993 | Weiss et al. | 84/603 |
| 5,281,754 A | * | 1/1994 | Farrett et al. | 84/609 |
| 5,533,903 A | * | 7/1996 | Kennedy | 434/307 R |
| 5,597,971 A | * | 1/1997 | Saito | 84/669 |
| 5,629,491 A | * | 5/1997 | Usa | 84/636 |
| 5,690,496 A | * | 11/1997 | Kennedy | 434/307 R |
| 5,746,605 A | * | 5/1998 | Kennedy | 434/307 R |
| 5,841,053 A | * | 11/1998 | Johnson et al. | 84/615 |
| 5,990,407 A | * | 11/1999 | Gannon | 84/613 |
| 6,072,113 A | * | 6/2000 | Tohgi et al. | 84/470 R |
| 6,211,451 B1 | * | 4/2001 | Tohgi et al. | 84/470 R |
| 6,287,124 B1 | * | 9/2001 | Yamaura et al. | 434/219 |
| 6,346,666 B1 | * | 2/2002 | Tsai et al. | 84/637 |

(Continued)

*Primary Examiner*—Lincoln Donovan
*Assistant Examiner*—Christina Russell
(74) *Attorney, Agent, or Firm*—Meyertons Hood Kivlin Kowert & Goetzel, P.C.; B. Noël Kivlin

(57) ABSTRACT

Various embodiments are directed to an automated method and system component for generating variations of one or more musical selections directed to particular students or to particular skill-levels into which students may be classified. The method and system component may be included in a wide variety of different music rendering, music display, and music instruction systems. In one embodiment, variations are generated by filtering each layer of a musical selection with respect to a number of common, musical elements, with the filtering chosen to reflect a selected or desired skill-level. In this embodiment, the layers of a musical selection include a melody line, a chord progression, and a bass line, and musical elements include key-signature, rhythm, pitch range, tempo and meter, and technique. Skill-level may be based on a numerically-encoded range of skill-levels, or may include a number of fixed skill-levels, such as beginning, easy, intermediate, and advanced levels.

22 Claims, 28 Drawing Sheets

U.S. PATENT DOCUMENTS

| | | | |
|---|---|---|---|
| 6,353,167 B1* | 3/2002 | Tuttle | 84/477 R |
| 6,426,455 B2* | 7/2002 | Hasegawa | 84/470 R |
| 6,448,486 B1* | 9/2002 | Shinsky | 84/613 |
| 6,639,138 B1* | 10/2003 | Hester | 84/470 R |
| 6,660,922 B1* | 12/2003 | Roeder | 84/477 R |
| 6,751,439 B2* | 6/2004 | Tice et al. | 434/350 |
| 6,936,758 B2* | 8/2005 | Itoh | 84/470 R |
| 7,053,291 B1* | 5/2006 | Villa | 84/609 |
| 7,174,510 B2* | 2/2007 | Salter | 715/709 |
| 7,199,298 B2* | 4/2007 | Funaki | 84/477 R |
| 7,238,876 B1* | 7/2007 | Worrall et al. | 84/722 |
| 7,288,705 B1* | 10/2007 | Nelson | 84/10 |
| 2002/0004191 A1* | 1/2002 | Tice et al. | 434/350 |
| 2002/0096036 A1* | 7/2002 | Tan | 84/471 R |
| 2003/0167903 A1* | 9/2003 | Funaki | 84/477 R |
| 2003/0167904 A1* | 9/2003 | Itoh | 84/609 |
| 2003/0207239 A1* | 11/2003 | Langlois | 434/178 |
| 2004/0055441 A1* | 3/2004 | Katsuta | 84/470 R |
| 2005/0241459 A1* | 11/2005 | Risley | 84/464 A |

* cited by examiner

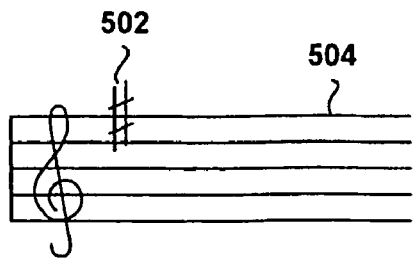
Figure 5
| | Major | Minor |
|---|---|---|
| 0 | C,G | A,E |
| 1 | C,D,F,G | A,B,D,E |
| 2 | C,D,F,G,A,Bb | A,B,D,E,F#,G |
| 3 | C,D,Eb,E,F,G,A,Bb | A,B,C,C#,D,E,F#,G |
| 4 | C,D,Eb,E,F,G,Ab,A,Bb,B | A,B,C,C#,D,E,F,F#,G,G# |
Figure 6
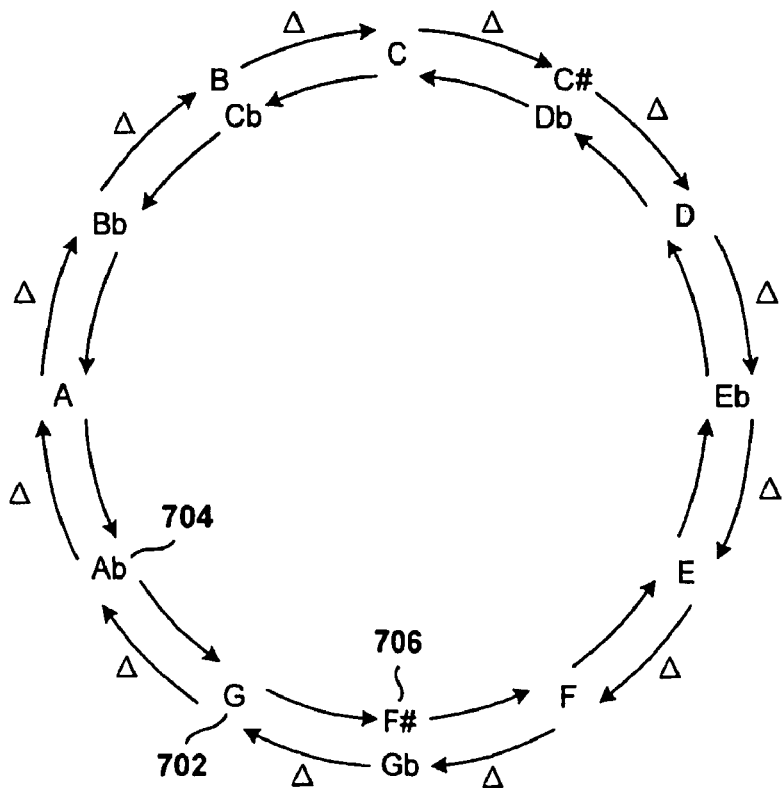
Figure 7

|   | shortest note | rests | syncopation | dotted note |
|---|---|---|---|---|
| 0 | $\frac{1}{4}$ | F | F | F |
| 1 | $\frac{1}{4}$ | T | F | F |
| 2 | $\frac{1}{4}$ | T | T | T |
| 3 | $\frac{1}{8}$ | F | F | F |
| · | $\frac{1}{8}$ | T | F | F |
| · | $\frac{1}{8}$ | T | T | F |
| · | $\frac{1}{8}$ | T | T | T |

Figure 10

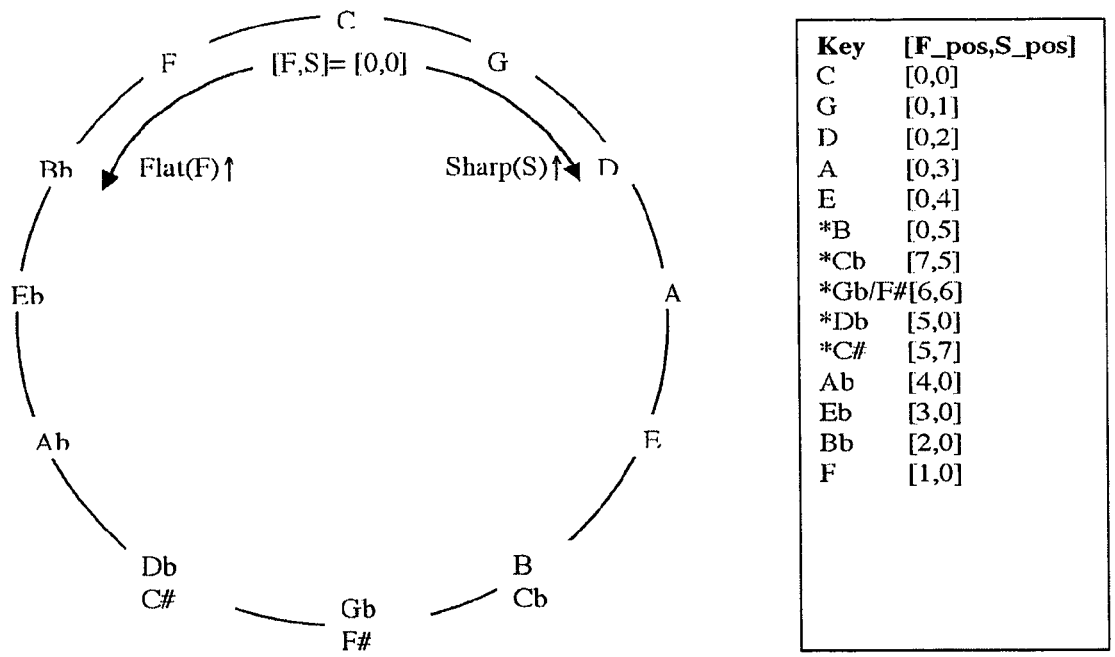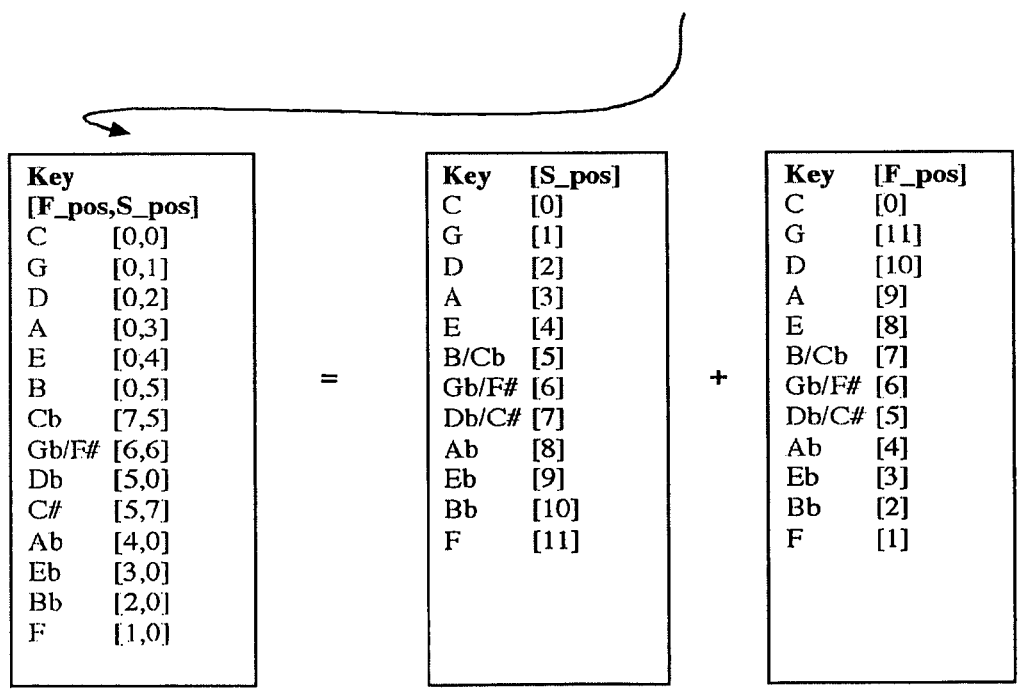
Figure 12 where F_pos or S_pos > 6 = 0, unless *RuleFS described above applies.

| Node (Level) | filtered/ unfiltered | | | | | | | | | | | | | | |
|---|---|---|---|---|---|---|---|---|---|---|---|---|---|---|---|
| 1 | 14/1 | | | | | | | C | | | | | | | |
| 2 | 12/3 | | | | | | F | C | G | | | | | | |
| 3 | 10/5 | | | | | Bb | F | C | G | D | | | | | |
| 4 | 8/7 | | | | Eb | Bb | F | C | G | D | A | | | | |
| 5 | 6/9 | | | Ab | Eb | Bb | F | C | G | D | A | E | | | |
| 6 | 4/11 | | Db | Ab | Eb | Bb | F | C | G | D | A | E | B | | |
| 7 | 2/13 | | Gb | Db | Ab | Eb | Bb | F | C | G | D | A | E | B | F# |
| 8 | 0/15 | Cb | Gb | Db | Ab | Eb | Bb | F | C | G | D | A | E | B | F# | C# |

Figure 15

Distance

| | 0 | 1 | 2 | 3 | 4 | 5 | 6 | 5 | 4 | 3 | 2 | 1 |
|---|---|---|---|---|---|---|---|---|---|---|---|---|
| C  | C  | C# | D  | D# | E  | F  | F# | G  | G# | A  | A# | B  |
| C# | C# | D  | D# | E  | F  | F# | G  | G# | A  | A# | B  | C  |
| D  | D  | D# | E  | F  | F# | G  | G# | A  | A# | B  | C  | C# |
| D# | D# | E  | F  | F# | G  | G# | A  | A# | B  | C  | C# | D  |
| E  | E  | F  | F# | G  | G# | A  | A# | B  | C  | C# | D  | D# |
| F  | F  | F# | G  | G# | A  | A# | B  | C  | C# | D  | D# | E  |
| F# | F# | G  | G# | A  | A# | B  | C  | C# | D  | D# | E  | F  |
| G  | G  | G# | A  | A# | B  | C  | C# | D  | D# | E  | F  | F# |
| G# | G# | A  | A# | B  | C  | C# | D  | D# | E  | F  | F# | G  |
| A  | A  | A# | B  | C  | C# | D  | D# | E  | F  | F# | G  | G# |
| A# | A# | B  | C  | C# | D  | D# | E  | F  | F# | G  | G# | A  |
| B  | B  | C  | C# | D  | D# | E  | F  | F# | G  | G# | A  | A# |

Figure 16

| | filtered/unfiltered | | | | | | | | | | | | | | |
|---|---|---|---|---|---|---|---|---|---|---|---|---|---|---|---|
| l) | 14/1 | C | C | C | C | C | C | C | C | C | C | C | C | C | C |
| | 12/3 | C | F/G | C | G | F | C | F | C | G | C | G | F | C | F/G | C |
| | 10/5 | Bb/C | F/G | C/D | G | D | Bb | F | C | G | D | Bb | F | Bb/C | F/G | C/D |
| | 8/7 | Bb/C | F/G | C/D | G/A | Eb | Bb | F | C | G | D | A | Eb/F | Bb/C | F/G | C/D |
| | 6/9 | Bb/C | F/G | C/D | Ab | Eb | Bb | F | C | G | D | A | E | Bb/C | F/G | C/D |
| | 4/11 | B | F/G | Db | Ab | Eb | Bb | F | C | G | D | A | E | B | F/G | Db |
| | 2/13 | B | Gb | Db | Ab | Eb | Bb | F | C | G | D | A | E | B | F# | Db |
| | 0/15 | Cb | Gb | Db | Ab | Eb | Bb | F | C | G | D | A | E | B | F# | C# |

Figure 17

| Level | Rests | > 16th | 16th | Dotted 16th | 8th | Dotted 8th | Quarter | Dotted 4th | Half | Dotted Half | Whole |
|---|---|---|---|---|---|---|---|---|---|---|---|
| 1 | N | N | N | N | N | N | N | N | Y | N | Y |
| 1a | Y | N | N | N | N | N | N | N | Y | N | Y |
| 2 | N | N | N | N | N | N | Y | N | Y | N | Y |
| 2a | Y | N | N | N | N | N | Y | N | Y | N | Y |
| 3 | N | N | N | N | N | N | Y | N | Y | Y | Y |
| 3a | Y | N | N | N | N | N | Y | N | Y | Y | Y |
| 4 | N | N | N | N | Y | N | Y | N | Y | Y | Y |
| 4a | Y | N | N | N | Y | N | Y | N | Y | Y | Y |
| 5 | N | N | N | N | Y | N | Y | Y | Y | Y | Y |
| 5a | Y | N | N | N | Y | N | Y | Y | Y | Y | Y |
| 6 | N | N | Y | N | Y | N | Y | Y | Y | Y | Y |
| 6a | Y | N | Y | N | Y | N | Y | Y | Y | Y | Y |
| 7 | N | N | Y | N | Y | Y | Y | Y | Y | Y | Y |
| 7a | Y | N | Y | N | Y | Y | Y | Y | Y | Y | Y |
| 8 | N | Y | Y | N | Y | Y | Y | Y | Y | Y | Y |
| 8a | Y | Y | Y | N | Y | Y | Y | Y | Y | Y | Y |
| 9 | N | Y | Y | Y | Y | Y | Y | Y | Y | Y | Y |
| 9a | Y | Y | Y | Y | Y | Y | Y | Y | Y | Y | Y |

Figure 18

| ONB | OFFB | OFFB | OFFB | ONB | ONB | ONB |
|-----|------|------|------|-----|-----|-----|
| TFN | TFN | TFN | TFN | TFN | NV | TFN |
| TFN | - | - | - | TFN | NV | TFN |
| TFN...... | ......... | ......... | ......... | TFN | NV | TFN |
| | | | | | | |

Figure 19

```
function a=combine(max)
clear a
ct=1
%max=8
for i=1:max
    for j=1:max
        for k=1:max
            for l=1:max
                for m=1:max
                    temp=cat(1,i,j,k,l,m);
                    if (length(unique(temp))==length(temp))
                        if (min(diff(temp))>0)
                            a{ct}=temp;
                            ct=ct+1;
                        end
                    end
                end
            end
        end
    end
end
```
clear temp

Figure 22

Columns 1 through 16

| 1 | 1 | 1 | 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 4 | 4 | 4 | 4 | 4 | 4 |
| 4 | 4 | 4 | 4 | 5 | 5 | 5 | 6 | 6 | 7 | 5 | 5 | 5 | 6 | 6 | 7 |
| 5 | 6 | 7 | 8 | 6 | 7 | 8 | 7 | 8 | 8 | 6 | 7 | 8 | 7 | 8 | 8 |

Columns 17 through 32

| 1 | 1 | 1 | 1 | 1 | 1 | 1 | 1 | 1 | 1 | 1 | 1 | 1 | 1 | 1 | 1 |
| 2 | 2 | 2 | 2 | 3 | 3 | 3 | 3 | 3 | 3 | 3 | 3 | 3 | 3 | 4 | 4 |
| 5 | 5 | 5 | 6 | 4 | 4 | 4 | 4 | 4 | 4 | 5 | 5 | 5 | 6 | 5 | 5 |
| 6 | 6 | 7 | 7 | 5 | 5 | 5 | 6 | 6 | 7 | 6 | 6 | 7 | 7 | 6 | 6 |
| 7 | 8 | 8 | 8 | 6 | 7 | 8 | 7 | 8 | 8 | 7 | 8 | 8 | 8 | 7 | 8 |

Columns 33 through 48

| 1 | 1 | 1 | 2 | 2 | 2 | 2 | 2 | 2 | 2 | 2 | 2 | 2 | 2 | 2 | 2 |
| 4 | 4 | 5 | 3 | 3 | 3 | 3 | 3 | 3 | 3 | 3 | 3 | 3 | 4 | 4 | 4 |
| 5 | 6 | 6 | 4 | 4 | 4 | 4 | 4 | 4 | 5 | 5 | 5 | 6 | 5 | 5 | 5 |
| 7 | 7 | 7 | 5 | 5 | 5 | 6 | 6 | 7 | 6 | 6 | 7 | 7 | 6 | 6 | 7 |
| 8 | 8 | 8 | 6 | 7 | 8 | 7 | 8 | 8 | 7 | 8 | 8 | 8 | 7 | 8 | 8 |

Columns 49 through 56

| 2 | 2 | 3 | 3 | 3 | 3 | 3 | 4 |
| 4 | 5 | 4 | 4 | 4 | 4 | 5 | 5 |
| 6 | 6 | 5 | 5 | 5 | 6 | 6 | 6 |
| 7 | 7 | 6 | 6 | 7 | 7 | 7 | 7 |
| 8 | 8 | 7 | 8 | 8 | 8 | 8 | 8 |

Figure 23

| No. of Black Keys | Fingers assigned to Black Keys (top down, increasing difficulty) | Semitones adjacent to black keys (left - right, Increasing difficulty) | | | |
|---|---|---|---|---|---|
| 1 | 3 | 3,4 | 2,3 | | |
| | 2 | 2,3 | 1,2 | | |
| | 4 | 3,4 | 4,5 | | |
| | 5 | - | | | |
| | 1 | - | | | |
| 2 | 2,3 | 3,4 | 1,2 | 3,4 & 1,2 | |
| | 3,4 | 2,3 | 4,5 | 2,3 & 4,5 | |
| | 2,4 | 1,2 | 4,5 | 1,2 & 4,5 | |
| | 2,5 | 1,2 | 4,5 | 1,2 & 4,5 | |
| | 3,5 | - | | | |
| | 4,5 | - | | | |
| | 1,2 | 2,3 | | | |
| | 1,3 | 3,4 | 1,2 | 1,2 & 3,4 | |
| | 1,4 | 1,2 | 3,4 | 4,5 | |
| | 1,5 | - | | | |
| 3 | 2,3,4 | - | | | |
| | 2,3,5 | - | | | |
| | 3,4,5 | - | | | |
| | 1,2,3 | - | | | |
| | 1,3,5 | - | | | |
| | 1,2,5 | - | | | |
| | 1,4,5 | - | | | |
| 4 | 2,3,4,5 | 1,2 | | | |
| | 1,3,4,5 | 2,3 | 1,2 | | |
| | 1,2,3,4 | - | | | |

Figure 24

|  | BK 0 1 2 3 | | | |
|---|---|---|---|---|
| BK 0 1 2 3 | (1) StepWise<br>(2) Non Diatonic<br>(3) Chromatic | (1) StepWise<br>(2) Non Diatonic<br>(3) Non Chromatic | (1) Non StepWise or SkipWise<br>(2) Non Diatonic<br>(3) Chromatic | BK 0 1 2 3 |
| BK 0 1 2 3 | (1) StepWise<br>(2) Diatonic<br>(3) Chromatic | (1) StepWise<br>(2) Diatonic<br>(3) Non Chromatic | (1) Non StepWise or SkipWise<br>(2) Non Diatonic<br>(3) Non Chromatic | BK 0 1 2 3 |
| | | | (1) Non StepWise or SkipWise<br>(2) Diatonic<br>(3) Chromatic | BK 0 1 2 3 |
| BK=<br>Black<br>Keys | | | (1) Non StepWise or SkipWise<br>(2) Diatonic<br>(3) Non Chromatic | BK 0 1 2 3 |
|  | BK 0 1 2 3 | | | |

Figure 25

|  | Group 1 |  | Group 2 & 3 |
|---|---|---|---|
|  | Range - any 5$^{th}$<br>Step-wise |  | Range - any 6th<br>Group 2, skip 1-2<br>Group 3, skip 2-3 |
| 1a. | No black keys | 2&3a. | No black-keys |
| 1b. | One black key, finger 3 | 2&3b. | One black key, finger 3 |
|  | Upper: Semitone between 3-4 |  | Upper: Semitone between 3-4 |
|  | Lower: Semitone between 2-3 |  | Lower: Semitone between 2-3 |
| 1c. | One black key, finger 2 | 2&3c. | One black key, finger 2 |
|  | Upper: Semitone between 2-3 |  | Upper: Semitone between 2-3 |
|  | Lower: Semitone between 1-2 |  | Lower: Semitone between 1-2 |
| 1d. | One black key, finger 4 | 2&3d. | One black key, finger 4 |
|  | Upper: Semitone between 3-4 |  | Upper: Semitone between 3-4 |
|  | Lower: Semitone between 4-5 |  | Lower:Semitone between 4-5 |
| 1e. | Two black keys, fingers 2&3 | 2&3e. | Two black keys, fingers 2&3 |
|  | Upper: Semitone between 3-4 |  | Upper: Semitone between 3-4 |
|  | Lower: Semitone between 1-2 |  | Lower: Semitone between 1-2 |
| 1f. | Two black keys, fingers 3&4 | 2&3f. | Two black keys, fingers 3&4 |
|  | Upper: Semitone between 2-3 |  | Upper: Semitone between 4-5 |
|  | Upper: Semitone between 4-5 |  | Upper: Semitone between 2-3 |
|  | Lower: Semitone between 2-3; 4-5 |  | Lower: Semitone between 2-3; 4-5 |
|  | Lower: No Semitone |  | Lower: No Semitone |

Figure 26

|  | 1a | 1b | 1c | 1d | 1e | 1f |
|---|---|---|---|---|---|---|
| Right Hand | C,D,E,F,G; D,E,F,G,A; E,F,G,A,B; F,G,A,B,C; G,A,B,C,D; A,B,C,D,E; B,C,D,E,F; | D,E,F#,G,A; A,B,C#,D,E; | E,F#,G,A,B; B,C#,D,E,F; | F,G,A,Bb,C; B,C,D,Eb,F; | E,F#,G#,A,B; E#,F#,G#,A,B; B,C#,D#,E,F; | D,E,F#,G#,A; A,B,C#,D#,E; |
|  | G,A,Bb,C,D; C,D,Eb,F,G; | D,Eb,F,G,A; A,Bb,C,D,E; | C,D,E,F#,G; G,A,B,C#,D; | C,Db,Eb,F,G; G,Ab,Bb,C,D; Cb,Db,Eb,F,G; | F,G,Ab,Bb,Cb; F,G,Ab,Bb,C; A,B,C#,D#,E#; |
| Left Hand | G,F,E,D,C; A,G,F,E,D; B,A,G,F,E; C,B,A,G,F; D,C,B,A,G; E,D,C,B,A; F,E,D,C,B; | G,F,Eb,D,C; D,C,Bb,A,G; | C,Bb,A,G,F; F,Eb,D,C,B; | B,A,G,F#,E; F,E,D,C#,B; | C,Bb,Ab,G,F; Cb,Bb,Ab,G,F; F,Eb,Db,C,B; | G,F,Eb,Db,C; D,C,Bb,Ab,G; |
|  | D,C,B,A,G; E,D,C#,B,A; | A,G,F#,E,D; E,D,C#,B,A; | G#,E,D,C; D,C#,B,A,G; | A,G,F,Eb,D; E,D,C,Bb,A; | A,G#,F#,E,D; E,D#,C#,B,A; E#,D#,C#,B,A; | B,A,G#,F#,E; B,A,G#,F#,E#; G,F,Eb,Db,Cb; |
|  |  |  |  |  |  |  |

Figure 27

|  | 2a | 2b | 2c | 2d | 2e | 2f |
|---|---|---|---|---|---|---|
| Right Hand | B,D,E,F,G; C,E,F,G,A; D,F,G,A,B; E,G,A,B,C; F,A,B,C,D; G,B,C,D,E; A,C,D,E,F; | C,E,F#,G,A; G,B,C#,D,E; | D,F#,G,A,B; A,C#,D,E,F; | E,G,A,Bb,C; A,C,D,Eb,F; | D,F#,G#,A,B; A,C#,D#,E,F; | C,E,F#,G#,A; G,B,C#,D#,E; |
|  |  | F,A,Bb,C,D; B,D,Eb,F,G; | C,Eb,F,G,A; G,Bb,C,D,E; | B,D,E,F#,G; F,A,B,C#,D; | F,Ab,Bb,C,D; | E,G,Ab,Bb,Cb; E,G,Ab,Bb,C; G,B,C#,D#,E#; |
| Left Hand | A,F,E,D,C; B,G,F,E,D; C,A,G,F,E; D,B,A,G,F; E,C,B,A,G; F,D,C,B,A; G,E,D,C,B; | A,F,Eb,D,C; E,C,Bb,A,G; B,G,F#,E,D; F,D,C#,B,A; | D,Bb,A,G,F; G,Eb,D,C,B; A,F#,E,D,C; E,C#,B,A,G; | C,A,G,F#,E; G,E,D,C#,B; B,G,F,Eb,D;F, D,C,Bb,A; | D,Bb,Ab,G,F; G,Eb,Db,C,B; B,G#,F#,E,D; F##,D#,C#,B,A; | A,F,Eb,Db,C; E,C,Bb,Ab,G; C,A,G#,F#,E; C,A,G#,F#,E#; A,F,Eb,Db,Cb; |
|  |  |  |  |  |  |  |

Figure 28

|   | 3a | 3b | 3c | 3d | 3e | 3f |
|---|---|---|---|---|---|---|
| R H | B,C,E,F,G; C,D,F,G,A; D,E,G,A,B; E,F,A,B,C; F,G,B,C,D; G,A,C,D,E; A,B,D,E,F; | C,D,F#,G,A; G,A,C#,D,E; | D,Eb,G,A,B; A,Bb,D,E,F; | E,F,A,Bb,C; A,Bb,D,Eb,F; |  | C,D,F#,G#,A; G,A,C#,D#,E; |
|   |  | F,G,Bb,C,D; B,C,Eb,F,G; | C,Db,F,G,A; G,Ab,C,D,E; | B,C,E,F#,G; F,G,B,C#,D; | F,Gb,Bb,C,D; | E,F,Ab,Bb,Cb; E,F,Ab,Bb,C; G,A,C#,D#,E#; |
| L H | A,G,E,D,C; B,A,F,E,D; C,B,G,F,E; D,C,A,G,F; E,D,B,A,G; F,E,C,B,A; G,F,D,C,B; | A,G,Eb,D,C; E,D,Bb,A,G; | D,C#,A,G,F; G,F#,D,C,B; | C,B,G,F#,E; G,F,D,C#,B; |  | A,G,Eb,Db,C; E,D,Bb,Ab,G; |
|   |  | B,A,F#,E,D; F,E,C#,B,A; | A,G#,E,D,C; E,D#,B,A,G; | B,A,F,Eb,D,F; E,C,Bb,A; | B,A#,F#,E,D; | C,B,G#,F#,E; C,B,G#,F#,E#; A,G,Eb,Db,Cb; |

Figure 29

|   | 3a | 3b | 3c | 3d | 3e | 3f |
|---|---|---|---|---|---|---|
| R H | B,C,E,F,G; C,D,F,G,A; D,E,G,A,B; E,F,A,B,C; F,G,B,C,D; G,A,C,D,E; A,B,D,E,F; | C,D,F#,G,A; G,A,C#,D,E; | D,Eb,G,A,B; A,Bb,D,E,F; | E,F,A,Bb,C; A,Bb,D,Eb,F; |  | C,D,F#,G#,A; G,A,C#,D#,E; |
|   |   | F,G,Bb,C,D; B,C,Eb,F,G; | C,Db,F,G,A; G,Ab,C,D,E; | B,C,E,F#,G; F,G,B,C#,D; | F,Gb,Bb,C,D; | E,F,Ab,Bb,Cb; E,F,Ab,Bb,C; G,A,C#,D#,E#; |
| L H | A,G,E,D,C; B,A,F,E,D; C,B,G,F,E; D,C,A,G,F; E,D,B,A,G; F,E,C,B,A; G,F,D,C,B; | A,G,Eb,D,C; E,D,Bb,A,G; | D,C#,A,G,F; G,F#,D,C,B; | C,B,G,F#,E; G,F,D,C#,B; |  | A,G,Eb,Db,C; E,D,Bb,Ab,G; |
|   |   | B,A,F#,E,D; F,E,C#,B,A; | A,G#,E,D,C; E,D#,B,A,G; | B,A,F,Eb,D,F; E,C,Bb,A; | B,A#,F#,E,D; | C,B,G#,F#,E; C,B,G#,F#,E#; A,G,Eb,Db,Cb; |

Figure 30

METHOD AND SYSTEM FOR GENERATING MUSICAL VARIATIONS DIRECTED TO PARTICULAR SKILL-LEVELS

This application is a continuation-in-part of U.S. patent application Ser. No. 10/858,821, filed Jun. 1, 2004, now abandoned which claims priority to U.S. Provisional Application Ser. No. 60/548,927, filed Mar. 1, 2004, and claims priority to U.S. Provisional Application Ser. No. 60/475,214, filed May 30, 2003.

TECHNICAL FIELD

The present invention is related to musical training, automated musical training, musical arranging and interactive display systems and, in particular, to musical training, musical pedagogy, and interactive systems that generate and display variations of musical selections with varying levels of difficulty.

BACKGROUND

For hundreds of years, musical instructors and musical-instruction-book authors have manually prepared altered versions of musical selections to facilitate instruction of students with varying levels of skill and musical competence and for arranging musical selections for different types and numbers of musical instruments. By altering musical selections, music teachers and authors of musical instruction books can tailor well known and musically pleasing pieces to various skill-levels of different classes of students, as well as to skill-levels to which the music teachers and authors of musical instruction books are attempting to elevate a particular class of students. Variations of musical selections featuring a range of complexity levels can provide a useful vehicle for musical instruction that allows a student to experience the pleasure of performing musical pieces without also frustrating the student by demanding greater skill or musical competence than the student can be expected to display at a particular point in time. Such variation groups can also offer a pedagogical benefit. Instruction books typical of the art are usually based on a linear progress model—the student learns one piece and moves on to the next selection. In contrast to this, the proposed method of generating variation groups featuring a range of complexity levels based on a single composition allow the student to undertake new challenges with consistent and fine control over the nature and extent of those challenges. Because the variation groups are based on the same underlying composition, the underlying musical elements are common to all variations and can be carried from one variation to the next to an extent determined by user preference. For example, the method allows a user to proceed from a variation with simplified melody and bass, to a subsequent variation with identical bass, and melody with a small increase in technical challenge.

Until now, the generation of variations of musical selections with ranges of difficulties for performance has been largely a tedious, manual, arbitrary and imperfect process. In general, an instructor or musical-instruction-book author can provide, at best, one or only a few variations of a particular musical selection, and the granularity of skill-level addressed by the variations is thus rather large. A musical student is therefore constrained to selecting music from among an often narrow selection of musical pieces at any particular desired skill-level. Musical teachers, authors of musical-instruction-books, and other musical professionals have recognized the need for a means to generate a range of variations directed to a corresponding range of skill-levels for a large number of different musical pieces that is relatively inexpensive and efficiently in time, and that provides an ability to customize, or tailor, variation generation as closely as possible to an individual student or to a particular skill-level.

SUMMARY

Various embodiments are directed to an automated method and system component for generating variations of one or more musical selections directed to particular students or to particular skill-levels into which students may be classified. The method and system component may be included in a wide variety of different music rendering, music display, and music instruction systems. In one embodiment, variations are generated by filtering the individual layers of a musical selection with respect to a number of common musical elements, with the filtering chosen to reflect a selected or desired skill-level. The layers of a musical selection may include any monophonic or homophonic part, such as a melody, homophonic chord progression or bass line. The filtering may be applied to the layers individually, and the musical elements to which the filters may be applied include key-signature, rhythm, pitch, tempo and meter. Skill-level may be based on a numerically-encoded range of skill-levels, or may include a number of fixed skill-levels, such as beginning, easy, intermediate, and advanced levels.

BRIEF DESCRIPTION OF THE DRAWINGS

FIG. 5 shows the key-signature for the key-signatures Gmajor/Eminor.

FIG. 6 shows a table listing example major key-signature and minor key-signature sets for each skill-level, with skill-levels increasing in complexity, or difficulty, numerically from skill-level 0 to skill-level 4.

FIG. 7 shows an ordering of the key-signatures by semitones, in a circle of key-signatures.

FIG. 10 shows a table of rhythm filters used to alter the musical layers of a musical selection with respect to the rhythm element.

FIG. 12 shows the circle of fifths, and Key Type Boolean, for major key-signatures.

FIG. 15 shows the progression from greatest to lowest number of filtered key signatures, using the major key cycle of fifths.

FIG. 16 shows a table used to calculate the upward or downward distance in semitones (transpose value) from the source (filtered) key signature to the nearest available destination (play) key signature.

FIG. 17 is a table showing complementary source and destination key signatures for the major key circle of fifths.

FIG. 18 shows an embodiment of the Rhythmic Symbol Filter with eleven levels of rhythmic symbol filtering.

FIG. 19 shows how notes immediately preceding the deleted TFN are extended by the duration of the deletions.

FIG. 22 shows code for the generation of all permutations of 5 finger hand positions.

FIG. 23 shows the numerical output for the above code, for a range of perfect fifth (encompassing 8 pitches). The top number in each column corresponds to the start position (first finger, either hand).

FIG. 24 shows hand positions with one to four black keys grouped and ranked according to the position of the black keys and surrounding half semitones.

FIG. 25 summarizes the finger position clusters FP_1 ... 4.

FIG. 26 shows sample feature groups for increasing technical challenge.

FIGS. 27-39 show sample pitch permutations ranked in order of increasing difficulty.

DETAILED DESCRIPTION

Figure 1:
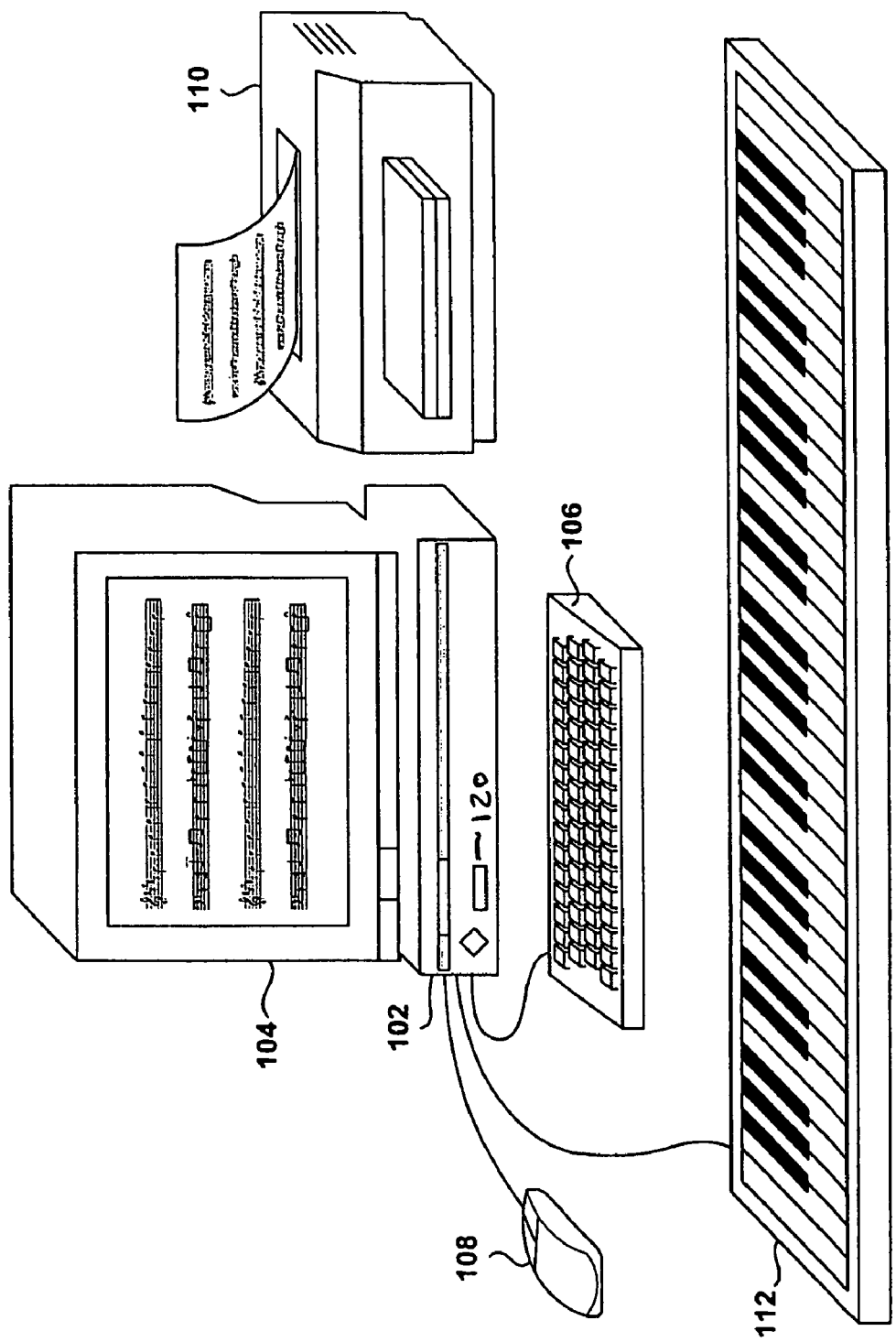
FIG. 1 illustrates a typical musical system in which the method and system component of various embodiments of the present invention may be included.

The present patent disclosure defines the primary elements of a composition as pitch and duration. These elements are organized and modified, individually or in combinations, to produce the following commonly understood musical attributes: key-signature; chromaticism; tempo; meter; note-length; note-speed; syncopation. Embodiments disclosed herein directly modify the primary elements of a musical composition, in order to control their amount, degree, rate, etc, and the corresponding complexity and degree of technical and intellectual challenge they present to the user when combined to form the above-described attributes of a musical composition. Attributes of the musical notation of the primary elements of a selected composition may also be controlled, as distinct from the elements themselves, in order to control the complexity and degree of intellectual challenge they present to the user. In particular, various embodiments disclosed herein may control the number of different rhythmic symbols allowed, and enharmonic spelling. Finally, various embodiments may control certain fundamental technical attributes of a selected composition, in order to control the degree of technical challenge they present to the user, including, for example, hand positions.

One particular embodiment employs procedures to: (1) determine the relative difficulty of the primary elements of a selected composition; (2) adjust those primary elements that exceed the limits of user skill level, to conform to skill-level; (3) remove, mark, or hide those primary elements that exceed user skill-level, when adjustment is not possible, or desired; (4) adjust the musical notation of the primary elements, to conform to limits of user skill-level; and, (5) discard or hide the standard notation of primary elements that exceed user skill-level, when adjustment is not possible, or desired. In one embodiment, the procedures are as follows: (1) a key-signature filter determines the best transposition interval to allow the key-signature of selected composition to conform to limits of user skill-level, when the given key-signature uses more symbols (sharps or flats) than permitted by user skill level; (2) a rhythmic-symbol filter alters the notation of rhythm, to conform to the limits of user skill-level, when the given notation uses more rhythmic symbols (16th, 8th, etc) than permitted by user skill level; (3) a note-speed filter determines the fastest speed (smallest rhythmic sub-division) at which a user can play, at the selected tempo, and removes, marks, or hides notes exceeding that limit; (4) a hand-position filter ranks the relative performance difficulty of all hand positions required in a selected composition, and restricts or adjusts those exceeding the limits of user skill-level. Additional filters can control the amount and type of chromaticism; the accidental type used in the musical notation; the number of unique durations (note-lengths) permitted; and the presence and/or amount of syncopation.

Embodiments are directed to a method and system component for automated generation of variations of musical selections with varying levels of difficulty, or, in other words, directed to various different levels of performance skill. Although the present invention is described, below, with respect to a small number of embodiments, there are many possible different variations of the present invention.

FIG. 1 illustrates a musical system in which the method and system component of various embodiments may be included. As shown on FIG. 1, a representative musical system may include a personal computer ("PC") 102 with a display device 104, standard input devices, such as a keyboard 106 and mouse 108, an attached printer 110, and one or more musical input devices, such as a keyboard 112 or electric guitar. The musical system can be used for musical composition, musical transposition, interactive display of music while performing or practicing, and for interactive instruction. For example, a user may arrange for the system to display portions of a musical selection while the user performs the musical selection on an attached musical input device, with the display automatically scrolled at a rate selected by the user, and with metronome beats output by the system at correct time intervals. As another example, the user may compose music using the standard input devices, with the composed music displayed interactively to the user on a display device 104 and printable by the user on the attached printer 110.

In the embodiment of FIG. 1, a system component 120 is additionally shown. System component 120 is representative of a storage medium that stores software instructions executable by a processor to implement the functionality of the musical system as described below. The storage medium may be any type of storage including, for example, CD-ROM, tape devices, individual disks, optical devices, flash-memory devices, or various types of RAM. It is noted that in alternative embodiments, rather than using a personal computer, other types of systems may be provided, such as a dedicated music processing system. In such systems, system component 120 may be implemented in software or hardware, or in combinations thereof.

Figure 2:
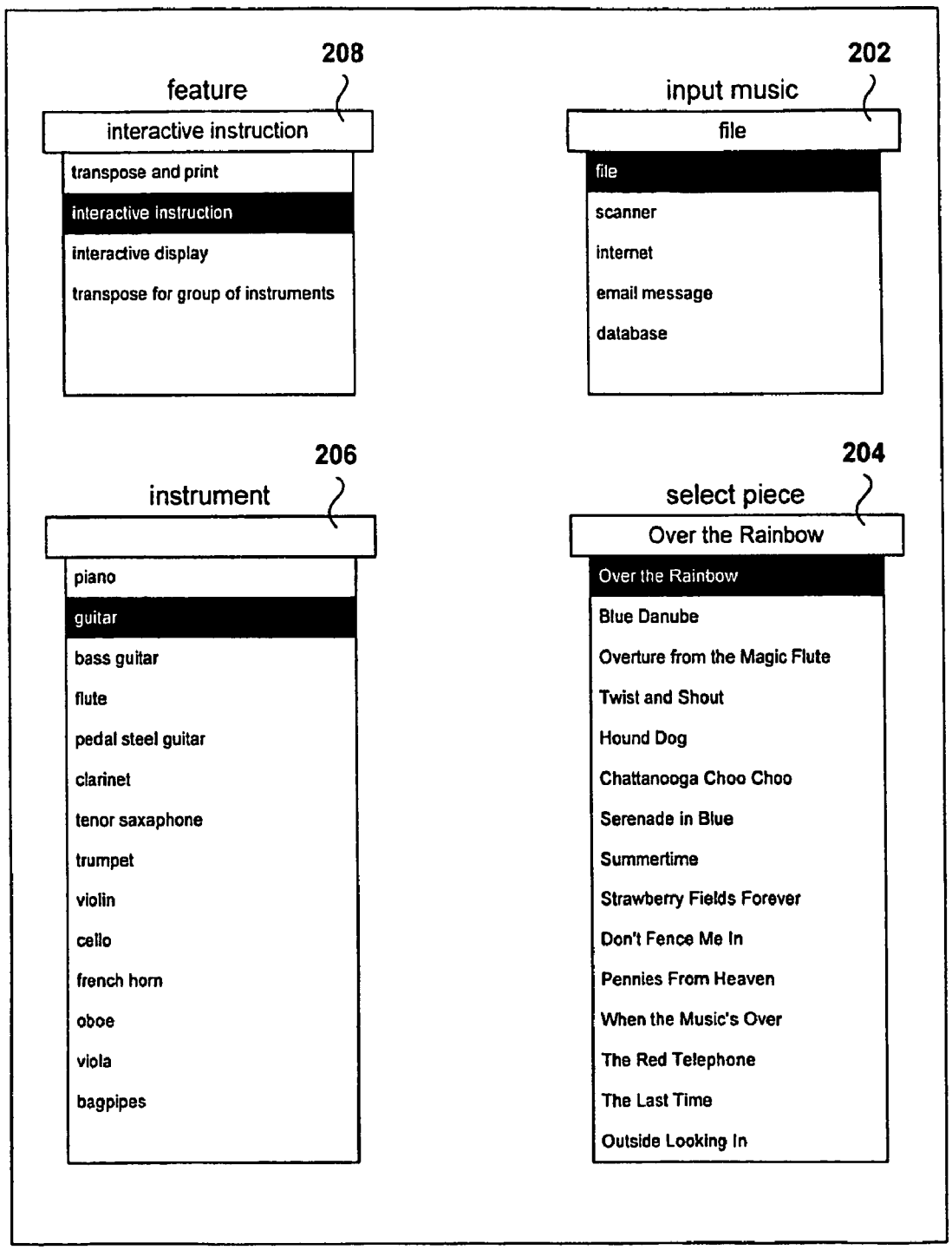
FIG. 2 is a high-level selection screen displayed by the musical system shown in FIG. 1.

FIG. 2 is a high-level selection screen displayed by the musical system shown in FIG. 1. The high-level selection screen, shown on FIG. 2, is an example selection screen generated by system component 120 that allows a user to specify operation of the musical system. In the example selection screen shown on FIG. 2, a user may select an input method for inputting a musical selection via a first selection window 202, select a specific musical piece in a second selection window 204, select an instrument or musical-input device in a third selection window 206, and select a system feature to invoke using a fourth selection window 208. Selection of any of the displayed options may, in turn, result in display of more detailed selection windows specific to the particular option selected. In the system illustrated in FIGS. 1 and 2, a user may choose to input music from a digital file, a database of music already inputted into the system, by scanning and digitizing sheet music, selecting the music from the internet, or from an email message. Many other possible types of input music may be added to this option list, depending on the type of user to which the musical system is directed. In the system described with respect to FIGS. 1 and 2, a user may choose to use the system for interactive instruction, much as an automated music teacher, interactively display musical selections for practice or performance, or transpose a musical selection to different parts for each of a group of instruments or to different key-signatures.

As discussed above, it would be desirable, in many different situations, including during operation of the musical system illustrated in FIGS. 1 and 2, to be able to generate one or more variations of a musical selection directed to an individual user's skill-level or to particular skill-levels in which users can be generally classified. For example, when the system is used for interactive display of a musical selection, to allow a user at a particular skill-level to perform the displayed music, it would be desirable for the user to be able to select, generate, and display a variation of a musical selection suitable for the user's skill-level. As an another example, it would be desirable for the user to be able to automatically generate a skill-level-directed variation of the musical selection for printing, including skill-level-directed variations for each part played by a group of musicians on different instruments.

Figure 3:
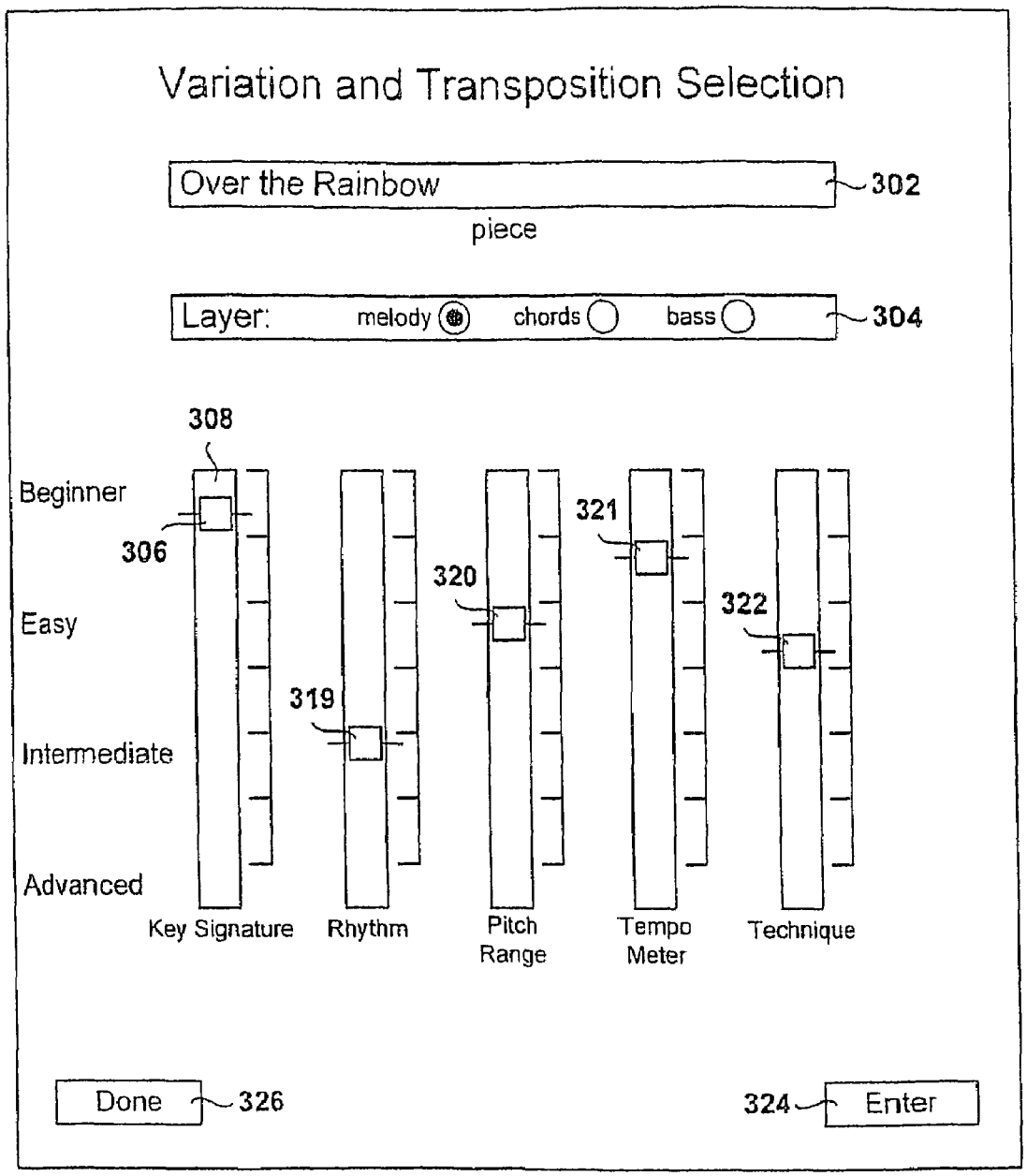
FIG. 3 shows a second-level display window that, in the hypothetical musical system illustrated in FIGS. 1 and 2, allows a user to select parameters that specify a variation of a musical piece directed to a particular skill-level.

One embodiment as disclosed herein provides a method and system component to enhance a musical system, such as the music system shown on FIGS. 1 and 2, to automatically generate skill-level-directed variations of selected pieces. In the musical system of FIG. 1, for example, once a user makes high-level selections that define subsequent operation of the musical system, a second-level selection window may be displayed by system component 120 to provide the user with the ability to generate a variation of a musical selection tailored to a desired skill-level for subsequent use in the instruction, display, or printing operation. FIG. 3 shows a second-level display window that, in the musical system illustrated in FIGS. 1 and 2, allows a user to select parameters that specify a variation of a musical piece directed to a particular skill-level.

The second high-level display window includes a text-display window 302 that displays the title of the musical selection. The second-level display window includes a layer-selection window 304 that allows the user to select one of a number of different layers of the musical selection. In the described embodiment, the layers may include (1) a monophonic melody line; (2) a homophonic chord part; (3) one or more subsidiary monophonic melody lines; and (4) a monophonic bass line. When the user selects a particular musical layer, using the layer-selection window 304, the musical system displays the skill-level, with respect to various different elements of the musical selection, to which a variation of the selected musical layer should be generated. In the display window shown in FIG. 3, the skill-level is shown as the position of a skill-selection slider button, such as skill-selection slider button 306, that can be moved vertically within a skill-selection-range window, such as skill-selection-range window 308. Initially, the skill-selection slider buttons may display default skill-level values for each element. In the described embodiment, the set of musical attributes with respect to which skill-level filters can be adjusted by the user includes: (1) the tempo (2) the meter (3) the number of rhythmic symbols; (4) the fastest rhythmic sub-division; (5) the presence or absence of syncopation (6) the key-signature; (7) the degree of chromaticism (8) the number of hand positions required (7) and the relative difficulty of required hand positions. When a user has adjusted the skill-level selections for each of the attributes for a particular layer, using the layer-selection window 304 and the skill-selection slider buttons 306 and 319-322, the user may input a mouse click to an enter button 324 to record the skill-level selections for the selected layer. Once the user is satisfied with the skill-level selections for all layers, the user can input a mouse click to a completion button 326, which collects and stores the skill-level selections and invokes a variation-generation routine to generate a variation of the indicated musical selection according to the user's skill-level selections.

Figure 4:
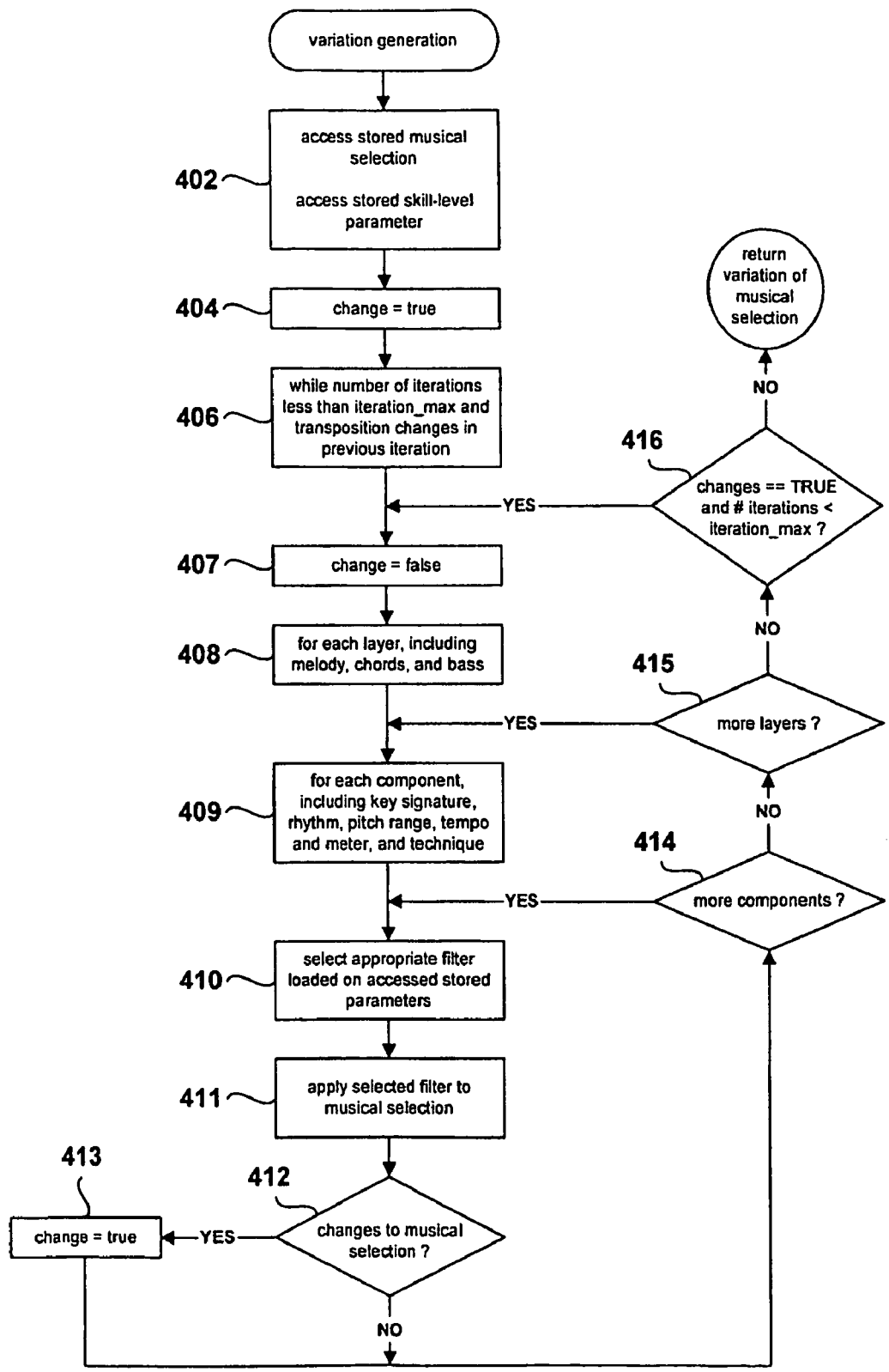
FIG. 4 is a high-level control-flow diagram for the routine "variation generation", which generates a variation of a musical selection according to skill-selection parameters input by a user.

FIG. 4 is a high-level control-flow diagram for the routine "variation generation" implemented by one embodiment of system component 120 to generate a variation of a musical selection according to skill-selection parameters input by a user. In step 402, the routine "variation generation" accesses a stored musical selection and accesses stored skill-level parameters that specify the variation to be generated from the stored musical selection. A musical selection may be stored in many different possible computer-readable music encodings. The skill-level parameters may be numerical encodings of the skill-levels chosen with respect to each musical element of each musical layer, such as the parameters selectable via the hypothetical display window shown on FIG. 3, although many other encodings of the parameters values are also possible Next, in step 404, the variable "change" is set to the Boolean value TRUE. Then, in the while-loop of steps 406, 416, the routine "variation generation" iteratively generates a variation of the musical selection corresponding to the selection parameters accessed in step 402. As a first step in the while-loop, the variable "change" is set to FALSE, in step 407. Next, in the nested for-loops of step 408-415, a next iteration of variation generation is carried out. If, in this next iteration, any changes are made to the current state of the musical selection, as determined in step 412, then the variable "changes" is set to TRUE, in step 413, so that another iteration of the while-loop of step 406-416 is carried out. In the described embodiment of the routine "variation generation," execution of the while-loop of steps 406-416 may also be terminated when the number of iterations already executed is equal to a constant "iteration$_{max}$."

The outer for-loop of steps 408-415 considers, in each iteration, each layer of the selected composition, including the melody line, chord progression, and bass line in the described embodiment. The melody line corresponds generally to the dominant uppermost line, that which is sung by the leading singer in a vocal composition, generally in the treble-clef staves in standard musical notation. The chord part is generally a collection of chords, encoded by multiple note-indicating ovals adjoined via a common note stem, in the treble and/or bass clef staves of standard musical notation. The bass line is normally found in the bass clef staves in standard music notation. Thus, each of the layers separately treated in the described embodiment correspond directly to easily-identified sets of notes, rests, and other standard musical notation symbols representative of the primary elements, pitch and duration, for the selected composition. In each iteration of the inner for-loop of steps 409-414, each musical element is separately considered. In step 410, an appropriate filter or filters based on the user-specified and stored skill-level parameters is chosen for the element, and in step 411, the selected filter or filters is applied to the current state of the musical selection in order to translate the musical selection with respect to the currently considered musical element and currently considered musical layer to correspond to the user-specified and stored skill-level parameters. If application of the filter or filters, in step 411, results in additional changes to the musical selection, as detected in step 412, then the variable "changes" is set to TRUE in step 414. Conditional steps 414-416 control whether or not additional iterations of the next for-loops and encompassing while-loop are carried out. Thus, the routine "generation variation" iteratively applies filters to a musical selection until either no further changes are made to the selection or until a maximum number of iterations are executed, so that the resulting variations of the musical selection correspond to selected and stored skill-level parameters. An iterative approach allows the musical selection to be independently modified with respect to each layer and attribute.

Key-signature filtering may involve transposing a selected piece of music from an original key-signature to a new, simpler key-signature. A selected musical piece is associated with an original key-signature. The key-signature is determined by the number and positions of sharp symbols "♯" and flat symbols "♭" placed onto lines and spaces of a musical staff, directly following the initial clef symbol at the beginning of the musical notation for a selected composition. For a given key-signature, the sharp or flat symbols indicate semi-tone modifications to selected note-names and their associated pitch, in all octaves, from the group of seven note-names. For example, FIG. 5 shows the key-signature for G major/E minor. The sharp symbol 502 on the uppermost line 504 of the musical staff, representing the pitch F, indicates that the pitch F, in all octaves, should be raised one semi-tone, played as F♯. A piece of music can be changed, by transposition, from one key-signature to another key-signature by raising or lowering each note in a musical selection by a fixed number of semi-tones. For example, raising each note by a semi-tone changes the key-signature of F♯ major to G major, reducing the six sharp symbols of the F♯ major key-signature to the one sharp symbol shown on FIG. 5. In general, it is easier for a student to perform music in key-signatures with as few sharp or flat symbols as possible. Each flat or sharp symbol requires the student to remember to shift notes on which the sharp symbol or flat symbol is placed by one semi-tone. When no sharp symbols or flat symbols occur in the key-signature, such as in the key-signature of C major, the student has no semi-tone adjustments to make, or remember while performing the music.

In one embodiment, five different sets of key-signatures corresponding to five different skill-levels are employed. FIG. 6 shows a table listing example major key-signature and minor key-signature sets for each skill-level, with skill-levels increasing in complexity, or difficulty, numerically from skill-level 0 to skill-level 4. FIG. 7 shows an ordering of the key-signatures in a circle of key-signatures. Each key-signature is separated from an adjacent key-signature by one semi-tone in pitch, represented by the symbol "Δ". Thus, for example, raising the notes of the key-signature G major 702 by 1Δ results in key-signature A♭ major 704, while lowering the pitch of each note in a musical selection with key-signature G major by 1Δ results in key-signature F♯ major 706.

Figure 8:
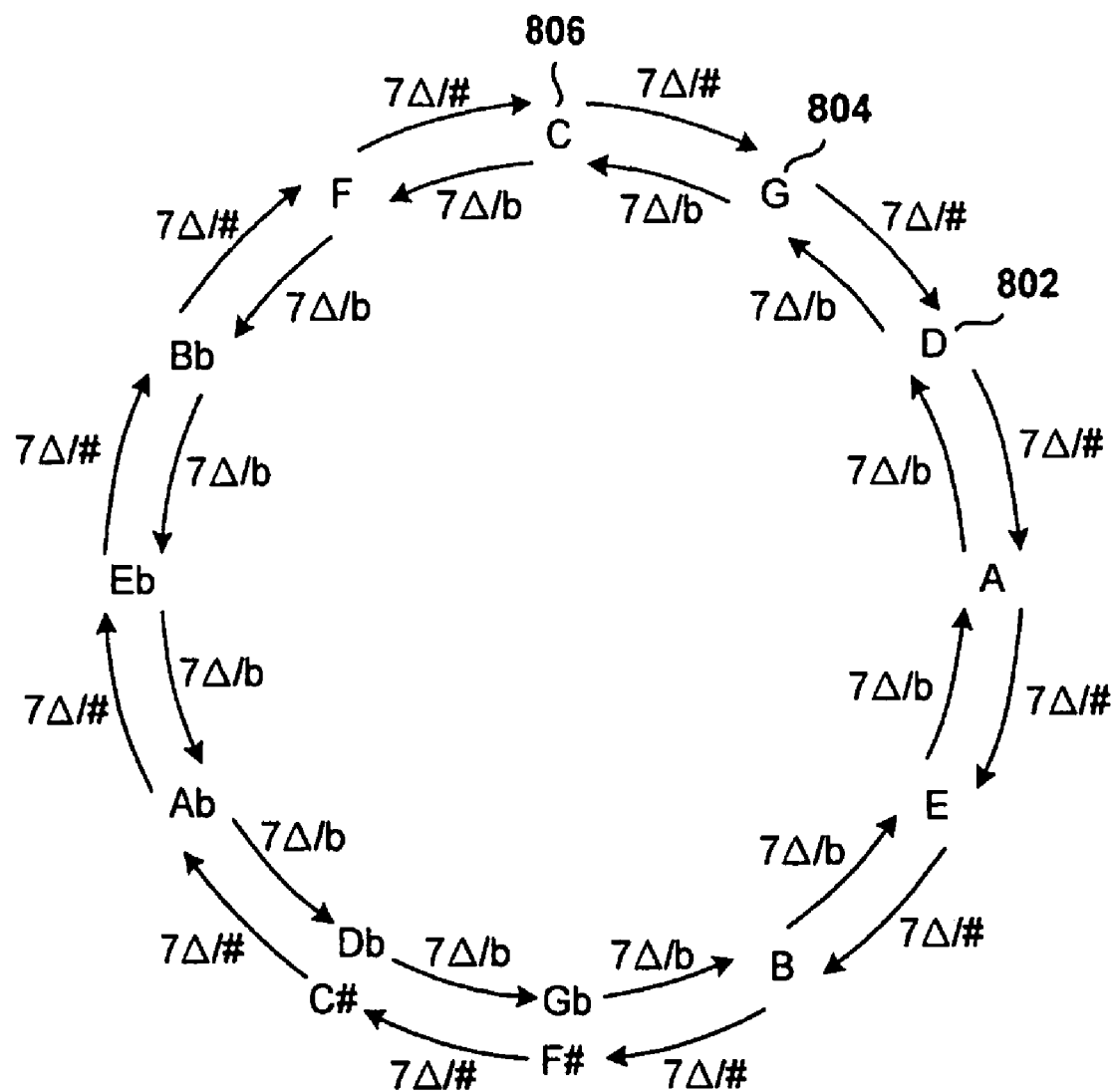
FIG. 8 shows a circle-of-fifths representation of the key-signatures.

In one embodiment, the following enharmonically equivalents key-signatures are allowed: B/C♭ major; F♯/G♭ major; C♯/D♭ major; G♯/A♭ minor; D♯/E♭ minor; A♯/B♭ minor. The key-signatures can be placed into a circle-of-fifths representation. FIG. 8 shows a circle-of-fifths representation of the key-signatures. Counter-clockwise is considered the flat direction, as the majority of the first six key-signatures encountered, when moving counter-clockwise from C major/A minor, use flats to indicate their normal semi-tone adjustments to the seven principle note-names. Clockwise is considered the sharp direction, as the majority of the first six key-signatures encountered, when moving clockwise from C major/A minor, use sharps to indicate their normal semi-tone adjustments to the seven principle note-names. In the circle-of-fifths representation, each key-signature is separated from adjacent key-signatures by 7Δ. Thus, for example, the key-signature G major 804 is separated from the key-signature D major 802 by 7Δ in the sharp direction, while the key-signature G major 804 is separated from the key-signature C 806 by 7Δ in the flat direction. A key-signature may be characterized as flat or sharp depending on its use of sharps or flats to indicate its normal semi-tone adjustments to the seven principle note-names. The key-signatures C major and A minor are considered neither flat nor sharp. Thus, a key-signature may be sharp, flat, or neither sharp nor flat.

Figure 9:
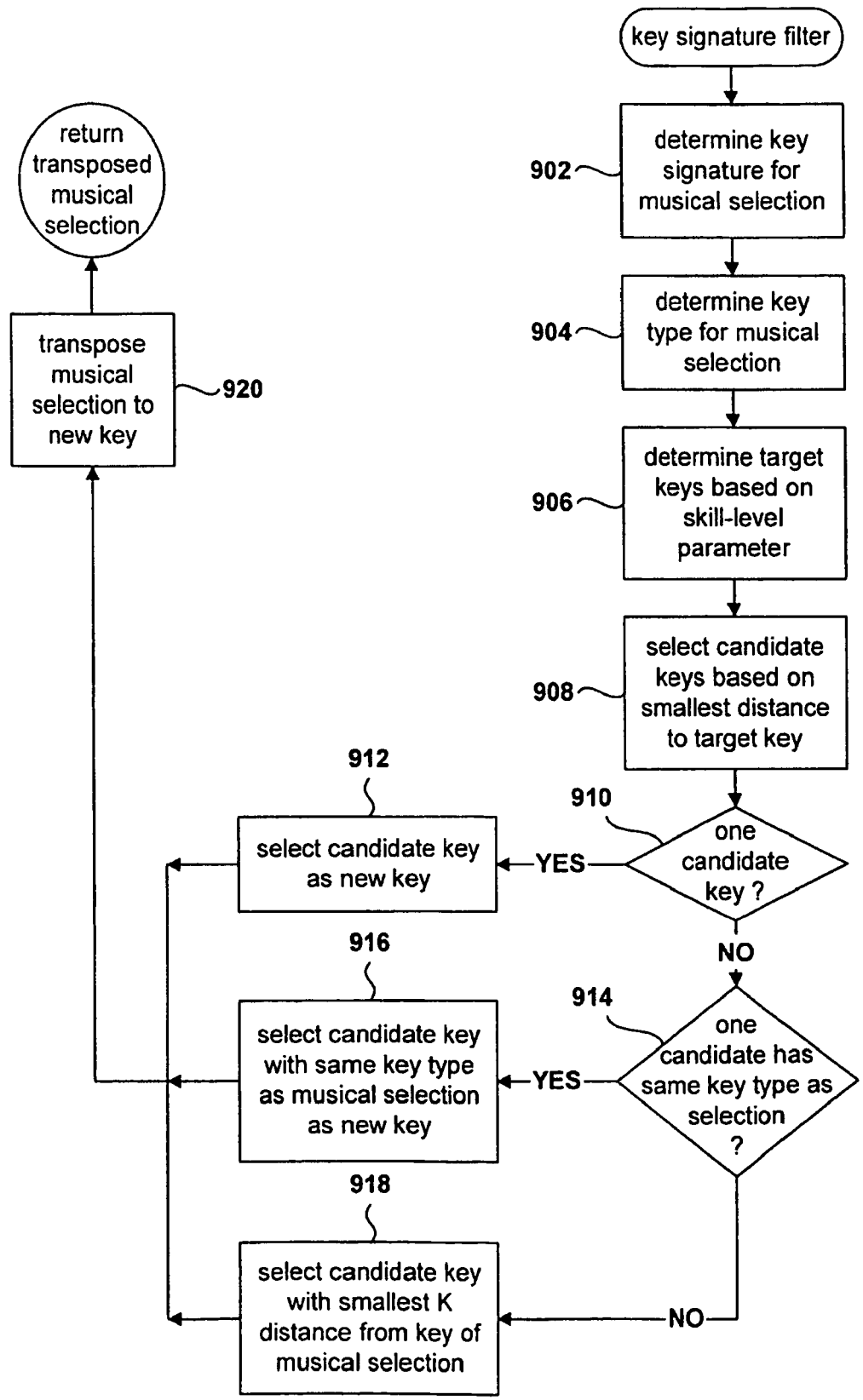
FIG. 9 is a control-flow diagram for the routine "key-signature filter" by which key-signature filtering is carried out in one embodiment of the present invention.

FIG. 9 is a control-flow diagram for the routine "key-signature filter" by which key-signature filtering is carried out in one embodiment of system component 120. In step 902, the routine "key-signature filter" determines the key-signature for the musical selection. The key-signature may be explicitly declared, or may be determined by noting the numbers and positions of sharp or flat symbols in the key-signature at the beginning of the musical notation for the selected musical piece. Next, in step 904, the routine "key-signature filter" determines the key-signature type for the key-signature determined in step 902. Next, in step 906, the routine "key-signature filter" determines the set of potential candidate key-signatures, determined by skill-level parameters input by user and stored. In one embodiment, input numerical skill-level values are mapped to the five skill-levels shown in FIG. 6. Next, in step 908, a set of candidate key-signatures is selected from the set of key-signatures corresponding to the selected skill-level, by choosing those having the smallest distance, upward or downward, measured in semi-tones, from the original key-signature. If, as determined in step 910, only a single candidate key-signature results from the selection of step 908, the single candidate key-signature is selected as a new key-signature, in step 912. Otherwise, if only one of the selected candidate key-signatures in step 908 has the same key-signature type as the original key-signature, as determined in step 914, then that candidate key-signature is selected as a new key-signature in step 916. If not, the candidate key with the smallest K distance from the key of musical selection is selected in step 918. Finally, in step 920, the musical selection is transposed from the original key-signature to the new key-signature by raising or lowering each note in the musical selection by the distance, in semi-tones, from the original key-signature to the new key-signature.

Thus, the Key-Signature Filter is a process for restricting standard musical notation to key signatures that conform to user skill-level. If the given music is written in a key-signature not permitted by the selected skill-level, using too many sharps or flats, it is transposed to a key-signature using fewer sharps or flats, conforming to the user skill-level. The procedure may determine the interval, measured in semitones, from the source key-signature to several destination key-signatures available at the selected skill-level. In one embodiment, the closest destination key-signature is selected, and the transposition interval is set to the interval between source and destination key-signatures. A suggested use is to select a software offset to map keys struck, for example on a musical keyboard, in the destination key, to corresponding tones in the source key signature. This would permit a user at a lower skill level to "play along", in a simpler key, with the original, un-transposed recording of a selected composition.

Figure 13:
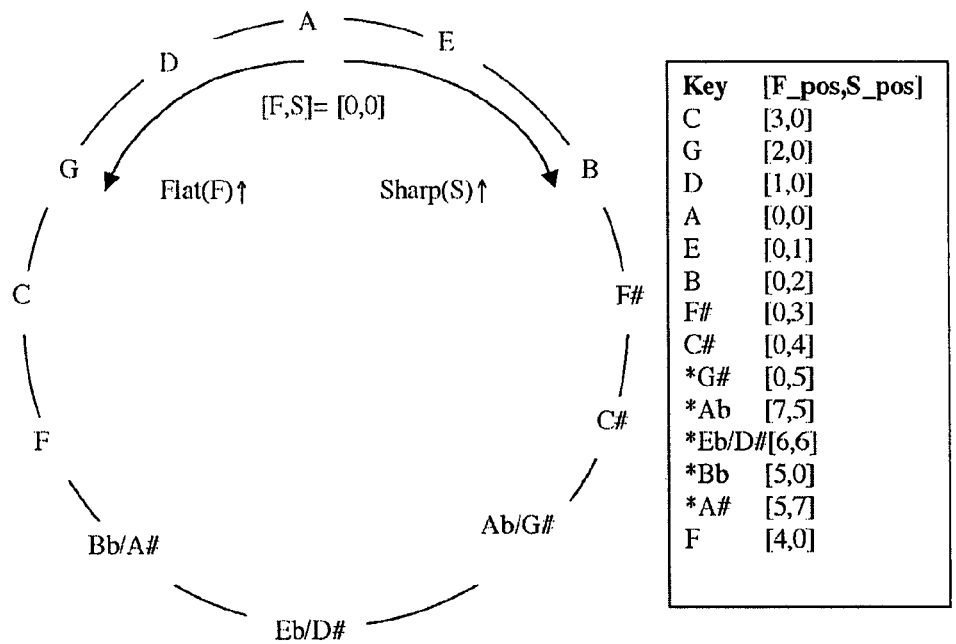
FIG. 13 shows the circle of fifths, and Key Type Boolean, for the minor key-signatures.

In one particular implementation, the following conditions may be declared: the Circle of Fifths has 12 positions. Three positions represent identical sounding key signatures with "enharmonic spellings". These are: F♯/G♭; C♯/D♭; B/C♭, for the major key circle of fifths, and A♯/B♭; D♯/E♭; G♯/A♭ for the minor key circle of fifths. Thus, each circle of fifths has 15 key signatures, referred to here as elements(E). Major Key-Signatures: C, C♯/D♭, D, E♭, E, F, F♯/G♭, G, A♭, A, B♭, B/C♭. Minor Key-Signatures: A, A♯/B♭, B, C, C♯, D, D♯/E♭, E, F, F♯, G, G♯/A♭. Δ=1 SemiTone Unit=½ step. Circle of Fifths: consecutive keys are every 7Δ apart. Major Key: C@12-o-clock position. Minor Key: Rotate circle counter-clockwise by 3K units such that A is at 12-o-clock position, where 1K unit=distance between two adjacent circle of fifth keys. F_pos: refers to position of key in the flat direction. S_pos: refers to position of key in the sharp direction. RuleFS: Each notation has a KeyType Boolean: {Flat,Sharp}={F,S}. (A) Notation with explicit KeyType specification, e.g. C♭ major: {F,S}={1,0}; C♯ major: {F,S}={0,1} (B) Notation without KeyType requires assignment of KeyType: if F_pos=S_pos=0, {F=0, S=0}; else if F_pos>S_pos→ {F=1,S=0}; else if F_pos<S_pos→{F=0,S=1}. E.g. G major: {F_pos,S_pos}= [0,1]→ {F,S}={0,1}; E major:{F_pos,S_pos}=[0,4]→{F, S}={0,1}. Note: RuleA supercedes RuleB. Certain keys have an enharmonic equivalent that allows a different notation of identical tones. For example, the major keys: {F♯,G♭}, {D♭, C♯}, {B,C♭} as shown above. For each of these keys {F,S} is determined via RuleFS(A-B): If for a given KeyPair {K1, K2}→{F_Pos>=0& F_pos<=6,S_pos>6}; K1{F,S}={0, 1}→{F_pos>0, S_pos>0}; K2{F,S}= {1,0}→{F_pos>0, S_pos=0}). FIG. 12 shows the circle of fifths, and Key Type Boolean, for major key-signatures. FIG. 13. shows the circle of fifths, and Key Type Boolean, for the minor key-signatures.

The procedure for key-signature filter creation in one implementation may be as follows: (1) Setup scale with 15 elements(E), twelve positions: Major Key Signatures: C, C♯/D♭, D, E♭, E, F, F♯/G♭, G, A♭, A, B♭, B/C♭. Minor Key Signatures: A, A♯/B♭, B, C, C♯, D, D♯/E♭, E, F, F♯, G, G♯/A♭. (2) Setup circle of fifth for major key (as described above, FIG. 12). (3) Setup circle of fifth for minor key via Maj2Min transform (see FIG. 13) Maj2Min Transform—Rotation(Major-3K). (4) Define KeyFilter(KM): KeyFilter[n], where n = 2m, m=1, 2, 3, 4, 5, 6, 7. As n↑, simplicity↑, since higher n determines lower number of sharps and flats. See FIG. 14 for key filter creation. KeyFilter[10]⇒Filter[10]⇒UnFilter[E-10]=UnFilter[5]; KeyFilter[8]⇒Filter[8]⇒UnFilter[E-8]⇒UnFilter[7]; KeyFilter[n]⇒Filter[n]⇒UnFilter[E-n]; KeyFilter[n=0, m=0]⇒UnFilter[E-15]=all keys unfiltered. (5) Define KeyFilter as a paired value. KeyFilter={KeyFilter_Major[n], KeyFilter_Minor[n]}.

Figure 14:
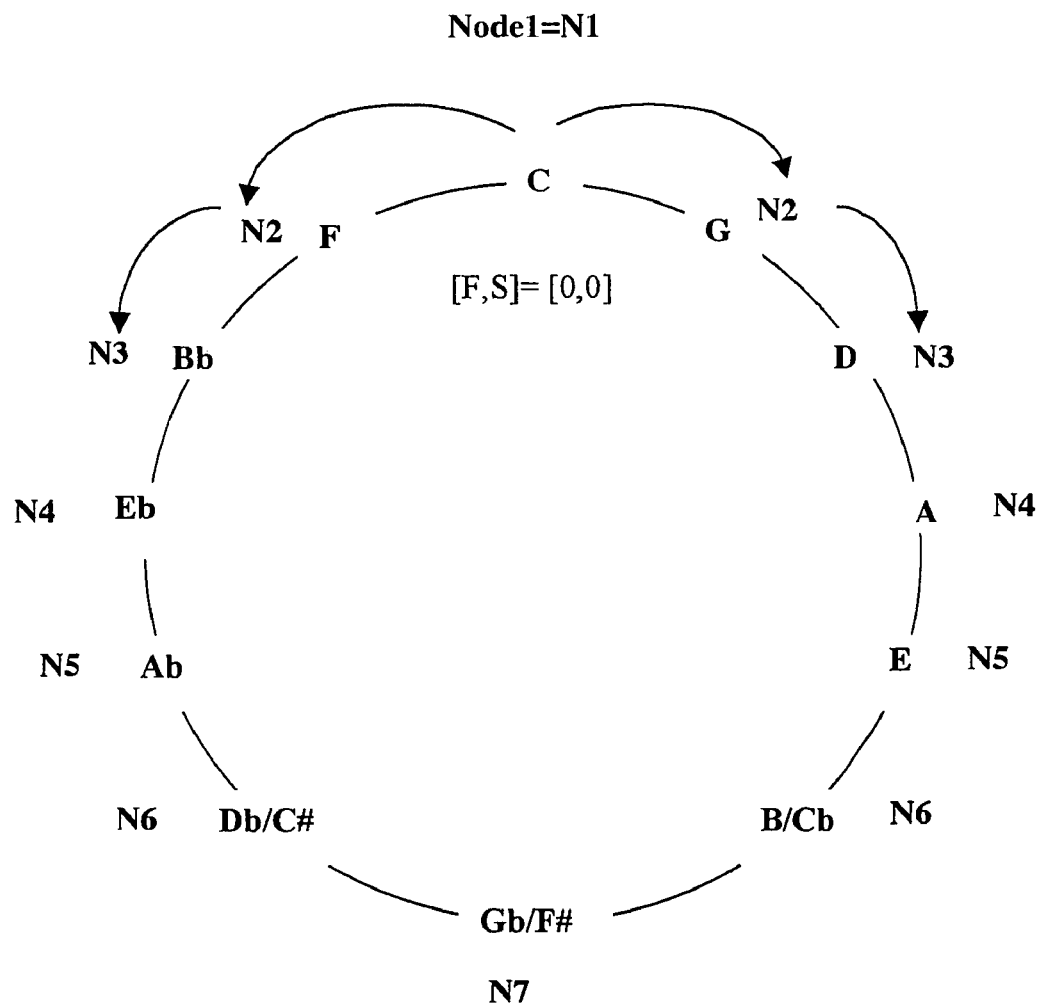
FIG. 14 shows the iterative process for generating key-filters for the major key-signatures.

FIG. 14 shows an iterative process for generating key-filters for the major key-signatures, as follows: Iteration 1:7 (m=1:7); Iteration 1: Generate Node1(N1)→KF14→ UnFilter[1]={C}; Iteration 2: Generate N2→ KF12→ UnFilter[3]= {UnFilter[2],G,F}={C,G,F}; Iteration 5: GenerateN5→ KF6 UnFilter[9]={UnFilter[7], {E,Ab}={C,G,F,D,B♭,A,E♭,E, A♭}. Key-signature filters may be created for the minor key-signatures by setting N1 as A minor, as defined the in the circle of fifths for the minor key-signatures. (See FIG. 13.)

A generalized description of the process is as follows: Set Seed Node: N1; Iteration 1: Start at N1; Iteration n+1, where n>0. Start from node n extend 1K units in both +/− direction. Create a union set between KF[n] and KF[n+1]. Iteration n=7: Stop process.

One embodiment of the key-signature filter would allow a software diagnostic to determine the user's Key-Signature Filter setting (skill level). The user would select a song and the system would determine the song's key signature, for example F♯ Major, called the source key. The system would determine the KeyType Boolean for the source key signature. The system would select a destination key signature closest (smallest Δ) to the source key-signature, from a pool of candidate key signatures meeting the limits of the selected skill-level. If the source key-signature is equidistant from more than one candidate destination key-signature, then the composition is transposed to the candidate key-signature of the same key-signature type, if two choices have different key-types, or to the candidate key-signature having smallest absolute(K) units, if two choices have same keytypes. An optional step is to set a play-transpose value to the distance in semi-tones(Δ) between the source key-signature and the destination key signature. For example, PlayTransposeValue (PTV)→ Transpose(PK → SK)={PK, PK+mΔ}. For example, a source key signature F♯ Major has KeyType[F,S]= [0,1]. A key-signature filter of level KF12_major has 3 candidate keys. (KM12_major={C,F,G}). Both F major and G major are equidistant, measured in semi-tones, from F♯. G[F_pos,S_pos]→[0,1], F[F_pos,S_pos]→[1,0]. G major is a sharp key-signature, F major is a flat signature: G[F_pos, S_pos]→[0,1], F[F_pos,S_pos]→[1,0]. Therefore, the composition is transposed to the destination key of G major.

FIG. 15 shows the progression from greatest to lowest number of filtered key signatures, using the major key cycle of fifths. FIG. 16 shows a table used to calculate the upward or downward distance in semitones (transpose value) from the source (filtered) key signature to the nearest available destination (play) key signature. FIG. 17 is a table showing complementary source and destination key signatures for the major key circle of fifths. Destination key-signatures are indicated by bold-typeface. The lowest row (level 8) has no filtered key signatures, and is thus identical to all source key signatures. To find the destination key signature for a source key signature the user intends to filter, first locate it in level 8, then move up the column to the destination level.

Rhythm refers to the timings at, and intervals between which, distinct pitches are produced by depressing fingers, blowing, striking strings or key-signatures, depending on the type of instrument to which the musical selection is directed. Rhythm also refers to the durations for which distinct pitches are held. In musical notation, this information is encoded by a combination of note types, a time signature, and various additional notational conventions, including dotting of notes to lengthen them, ties between notes to coalesce two notes into a single-time-duration event, and general tempo directives. FIG. 10 shows a table of attributes associated with rhythm that may be selectively controlled through different levels of filtering to alter the various layers of a musical selection with respect to both rhythmic content and rhythmic notation. In the table shown in FIG. 10, each row corresponds to a numbered skill-level. One embodiment of system component 120 maps specified skill-levels onto the range of skill-levels represented by the rows. In the described embodiment, each row includes indications of: (1) the smallest rhythmic sub-division symbol that can occur in the notation of the selected composition, for the specified skill-level; (2) a Boolean value indicating whether or not rests should be explicitly noted; (3) a Boolean value indicating whether or not dotted notes are allowed. (4) a Boolean value indicating whether or not syncopation is allowed. The system can take many different approaches to filtering a musical selection in order to ensure that the musical selection meets specified rhythm skill levels. For example, notes that are too short in duration can be removed, and adjacent notes extended, or rests inserted, to ensure that only notes having a durations equal to or greater than the specified shortest note for the skill-level occur. In alternative embodiments, both the pitch and duration of neighboring notes may be altered in order to smoothly filter short-duration notes. The time signature for the musical selection may also be modified as a part of the filtering process.

In one particular embodiment, system component 120 may accordingly implement a procedure, called the Rhythmic Symbol Filter, to limit the number of notation symbols used to indicate the rhythms in individual layers of a selected composition, in order to conform to the limits of the user skill-level. The rhythmic symbol filter excludes smaller rhythmic values, representing them as larger values by multiplying all rhythms by $2^n$ depending on filter level and selected composition. There are many possible rhythmic notation filters. FIG. 18 shows an embodiment of the Rhythmic Symbol Filter with eighteen levels of rhythmic symbol filtering. The following is a generalized description of the procedure for Rhythmic Symbol Filtering in one embodiment. In it, original music will be referred to OM and music played by the user after selection of a rhythm filter will be referred to as PM.

For Rhythmic Symbol Filters ending in the letter A (1A, 2A, 3A . . . 9A), allow only NOTE values. For Rhythmic Symbol Filters ending in the letter B (1B, 2B, 3B . . . 9B), allow NOTE values and their corresponding REST values.

A Dotted-Note Transform(DNT) will be required if OM contains a dotted-note and the dotted-note representation is not allowed in the selected Rhythm Symbol Filter. DNT(.X)=X+½ X, where X is a given note value. For example, DNT(.½Note)=DNT(dotted half note)=½+¼.

A Fastest Note Transform(FNT) will be required if the fastest note value(NV) in OM is faster than the fastest note value allowed in the selected Rhythmic Symbol Filter. The steps are as follows:

(1) Determine fastest NV (smallest rhythmic sub-division) in selected rhythmic symbol filter: F1_PM=min(NV(RhythmFilterN)), where N=1A, 1B . . . XA,XB. For example, Rhythm Symbol Filter 1A/1B, F1_PM=¼ note. (2) Determine fastest NV in the original music: F1_OM=min(NV(OM))=½$^P$. (3) Resolve any tied note values, NV_T, in original music: NV_T =Tied(NV1, NV2 . . . NVn)=Σ(NV1, NV2, . . . ,NVn). (4) Determine slowest NV in the original music: S1_OM =max(NV(OM)), where NV(OM) includes (NV_T). S1_OM=½$^q$. (5) Threshold (τ)=Allowed Max(NV(PM)) =A$_{13}$Max(NV(PM))=4/1=4 whole notes=represented as 4 tied whole notes. Max(FNT(NV(OM)))≦τ⇒FNT(S1_OM)≦4/1. If FNT(S1_OM)>4/1: ♯Max NV in PM, ♯ PM=♯(NV(Rhythm Filtern))+2, where additive factor=2 includes 2/1+4/1 NV. (6) Determine ♯ (unique (NV(OM)))=♯ OM. If ♯OM<(q-p), then NV(OM')=sequence(½$^q$:½$^{q-1}$:½$^p$). Else: NV(OM')=NV(OM). (7) Determine ♯(unique(NV'(OM)))=♯OM'. If ♯OM'>♯PM, remove lowest ordered(OM'), till ♯OM'=♯PM.

For every OM analyses: C♭-Cf will be performed to determine if, as a function of selected Rhythm Symbol Filter: Outcome (FNT(OM))=Success(1)/Failure(0). If Outcome (FNT(OM))=0: Select a higher level Rhythmic Symbol Filter to play the current OM, or select a different OM, with S1_OM=max(OM') at current Rhythmic Symbol Filter. If Outcome(FNT(OM))=1: FNT_scalefac=F1_PM/F1_OM. For example, F1_PM=¼, F1_OM=1/32, S1_OM=½FNT_scalefac=8. FNT(OM)=FNT_scalefac*NV(OM)⇒NV(PM). For example, F1_PM=¼, F1_OM=1/32, S1_OM=½ NV(OM)= {1/32, ⅛, ¼, ½} FNT(NV(OM)) FNT(NV(OM),scalefac)=FNT({1/32, ⅛, ¼, ½}, 8)⇒NV(PM)={¼, 1, 2/1, 4/1}.

A Time Signature Transformation (TST) of OM to time signature for selected rhythmic symbol filter, is performed. TST(OM)⇒TS(PM). Time Signature, T, has 2 components, T=TN/TD. For example, T=4/4⇒TN=4, TD=4. TN, the numerator in the TS, refers to beats per measure. TD, the denominator in the TS, refers to the rhythm unit denoting the beat. For example, TN=4, TD=4⇒4 beats/measure=4*¼ notes per measure. TN=T1 +T2 +. . . +TK where K refers to Kth beat pattern in a measure. A beat pattern=nbeats each of TD duration. In TST, the beat pattern should be maintained constant. TST(OM)⇒TST(OM{TN,TD}, FNT_scalefac)= {TN(T1, . . . ,TK), TD*1/FNT_scalefac} For example, T=⅝=⅜+2/8, TN=TN{T1, T2}=TN{3,2}; TD=8. TST(OM)= T1/(8*⅛)+T2/(8*⅛)=3/1+2/1. In the case of TN, if T1≠T2 . TK, then TST(OM) maintains TN={T1, T2, . . . ,TK}. If T1=T2=TK, then TST(OM) maintains TN=T1. For example, if T=⅝=⅜+⅜ (T1=T2=3), then TST(OM,8)=3/1+3/1=2*(3/1)⇒TS(PM)=3/1.

For further clarity of visualizing beats, the TS derived in d-e can be further regrouped, according to the following formula, allowing creation of bar lines every 1/TD: 1/TD units⇒TS(PM)=TN/TD=TN*(1/TD)⇒TS(PM)=1TD. For example, TS: 3/1(from e2)⇒TS: 1/1.

System component 120 may additionally implement a Note Speed Filter configured to remove notes that are too fast depending upon the skill level of the user. In one particular embodiment, the Note Speed Filter determines the fastest speed (FS) possible at the selected skill-level, measured as the number of consecutive notes of identical duration playable by the user per minute. This value is compared to the effective speed of each note in the selected composition, allowing identification and filtering of too-fast-notes (TFN). The effective speed of any note, expressed as a rhythmic sub-division, is equal to the rhythmic sub-division of that note, plus the duration of all subsequent notes to which it is tied, and/or all subsequent rests between it and the next note start. The effective speed can also be expressed as a multiple of the selected BPM. For example, if a user can play a maximum 240 consecutive tones of identical duration in one minute, then FS = 240. If the selected composition is required at a tempo of 80 BPM and time signature =4/4, then an effective note speed of 1/16$^{th}$ exceeds FS, as it is 4×BPM =320. FS in this case would be 3×BPM =240, or, expressed as a rhythmic sub-division, eighth-note triplets.

Consecutive too-fast-notes (TFN) can be filtered based on either their "ON Beat" or "OFF Beat" status. Notes preceding a filtered "too fast" note are extended by the duration of the filtered note. The following is a generalized process description for filtering consecutive TFN in one embodiment of system component 120.

(1) Parse TS to determine 1Beat/BeatPattern as a function of note value specified in TD. For example, if time signature=2/2⇒TN=2 beats/measure, TD=½ note⇒1beat=½ note. Therefore, BeatPattern=beat, since TN has only 1 element. If time signature=⅝⇒TN=5 beats/measure, TD=⅛ note⇒1beat=⅛ note. Therefore, BeatPattern=beat, since TN has only 1 element. If time signature=⅝=⅜+2/8⇒TN=3+2 beats/measure, TD=⅛ note⇒1beat=⅛ note. Therefore, BeatPattern≠beat, since TN has 2 elements⇒BeatPattern1=dotted¼ note=⅜notes; BeatPattern2=¼note=2/8notes. If time signature=⅝=2/dotted quarter⇒TN=2 Beats/measure, TD=1 dotted quarter⇒1beat=1/dotted quarter. Therefore, BeatPattern=beat, since TN has only 1 element.

(2) Determine ON versus OFF Beats: If BeatPattern=Beat, then all beats=ON Beat. If BeatPattern≠Beat, then 1st Beat in BeatPattern=ON Beat, and all other beats in BeatPattern=OFF Beat.

(3) Determine speed of rhythmic sub-divisions. For example, if ½note=80 BPM⇒80=½ notes per minute, where ½note=Beat, then 160=¼ notes per minute; 320=⅛ notes per minute, etc.

(4) Consider the speed of a rhythmic sub-division, α, where Speed(α)=Tempo*(TD/α). α may, or may not be a single note value. α is a single note value if directly followed by another note, without a subsequent rest or note tied into. If α is not a single note value, then α=β+δ+χ1+. . . χn where β=rhythmic sub-division value, δ=total rhythmic sub-division value of all notes tied into, and χ=total rhythmic sub-division value of all intervening rests of length 1–n.

(5) Consider user can play at a tempo level β, where β indicates the number of consecutive notes per minute. A note, α, is considered to be a too fast note(TFN), if Speed(α)>β.

(6) Determine the position of all TFN as a function of ON/OFFBeat. If, at the selected tempo,β, user cannot play all of the Speed(α)/min α notes per minute, then delete all TFN at OFF Beats or all TFN at ON Beats. Extend all notes immediately preceding the deleted TFN by the duration of the deletions, as shown in FIG. 19. In FIG. 19 NV corresponds to a note value that is not TFN. This indicates that the duration of the played note= duration of the played note + duration of deleted TFN note following it.

Figure 20:
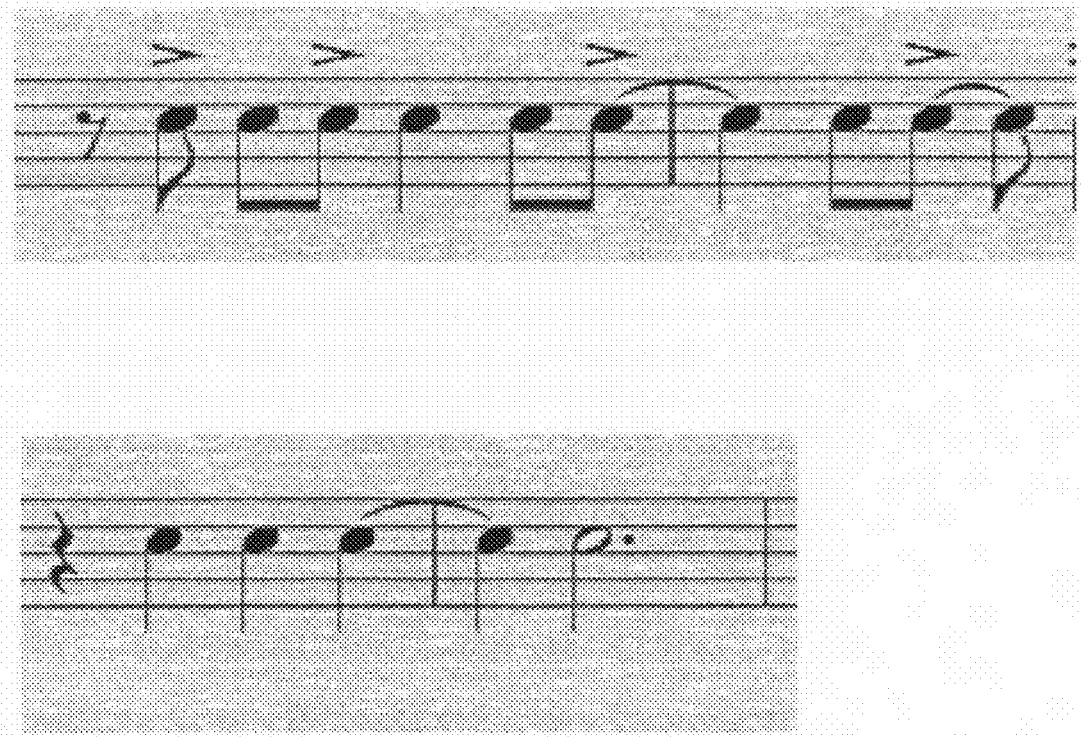
FIG. 20 shows a two measure rhythmic pattern before and after the above-described procedure, in the ease of TFN(OFF-Beats).
Figure 21:
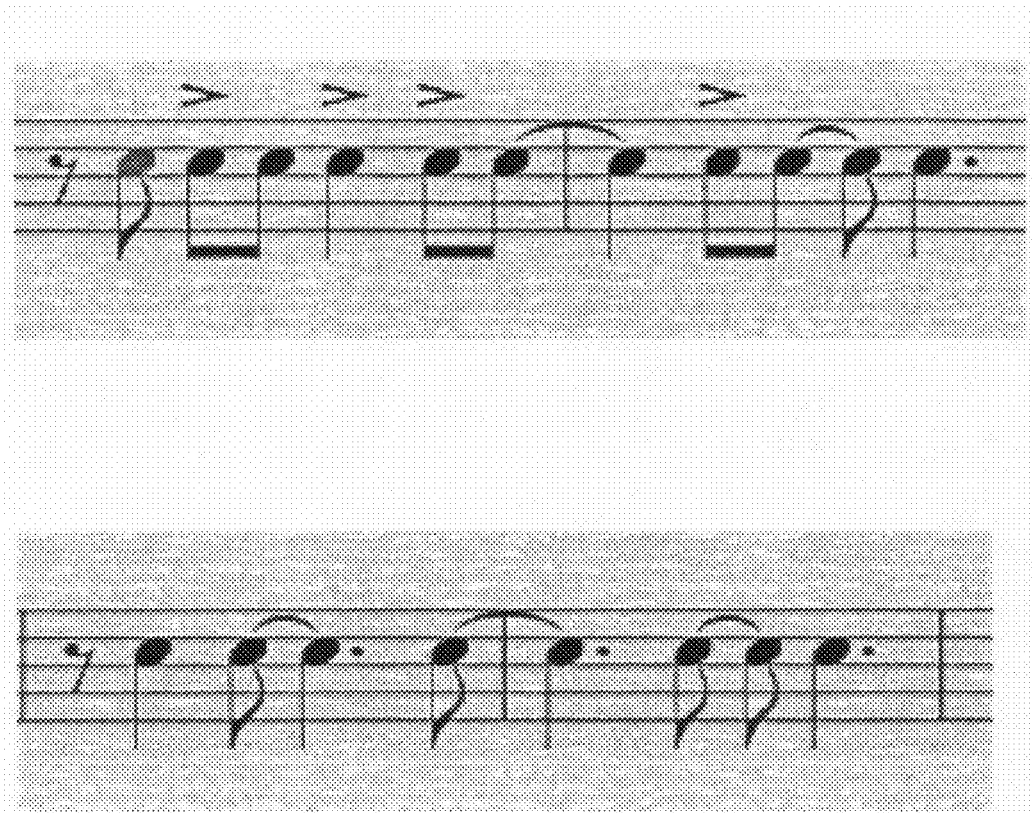
FIG. 21 shows the same two measure rhythmic pattern before and after the above-described procedure, in the case of TFN(ONBeats).

FIG. 20 shows a two measure rhythmic pattern before and after the above-described procedure, in the case of TFN(OFF-Beats). In the upper stave, off-beat notes are marked with an accent. Assuming an effective speed of ⅛$^{th}$ note is too fast for the selected user skill-level, the lower stave shows the resultant rhythm after the procedure. All off-beat notes with effective speed of ⅛$^{th}$ or faster (those marked) are removed, and notes immediately preceding the deleted notes are extended by the length of the deleted note. FIG. 21 shows the same two measure rhythmic pattern before and after the above-described procedure, in the case of TFN(ONBeats). In the upper stave, off-beat notes are marked with an accent. Assuming an effective speed of an eighth note is too fast for the selected user skill-level, the lower stave shows the resultant rhythm after the procedure. All on-beat notes with effective speed of ⅛$^{th}$ or faster (those marked) are removed, and notes immediately preceding the deleted notes are extended by the length of the deleted note.

A hand/finger filter may also be provided in embodiments of system component 120. In particular, a hand/finger filter may be provided that ranks the relative performance difficulty of hand positions in a selected composition, and restricts or adjusts those that exceed the limits of a user's skill-level. Upon ranking of the hand positions required in the selected composition, the hand/finger filter may generate a variation of the musical composition that requires a fewer number of hand/finger positions, that requires fewer hand-position changes, and/or that requires less complex hand/finger positions. in one particular embodiment, different pre-defined hand/finger positions (e.g., that may be encountered for a particular instrument of interest) may be ranked, for example, manually, and data associated with the rankings may be stored in association with system component 120. System component 120 may be configured to analyze a selected composition by comparing the hand/finger positions as required by the selected composition to the stored ranking data to thereby output the rankings for the particular hand/finger positions required by the composition. Based upon these rankings, system component 120 may be configured to perform a variety of additional functionality, as desired. For example, system component 120 may be configured to transpose the selected composition using the key-signature filtering method discussed above to generate a variation of the composition that requires simpler hand/finger positions. Alternatively, system component 120 may be configured to remove notes associated with difficult hand/finger positions from the selected composition. In yet further embodiments, when a user plays the selected composition on, for example, a keyboard device, system component 120 may be configured to automatically play those portions of the musical composition that require the more difficult hand/finger positions, or to segment out those notes giving rise to the more difficult hand/finger positions. Alternatively, system component 120 may be configured to generate a variation of the composition by applying a primary transposition to the entire composition, and a secondary transposition to those portions of the musical composition that require the more difficult hand/finger position, using the key-signature filtering method discussed above.

Figure 11:
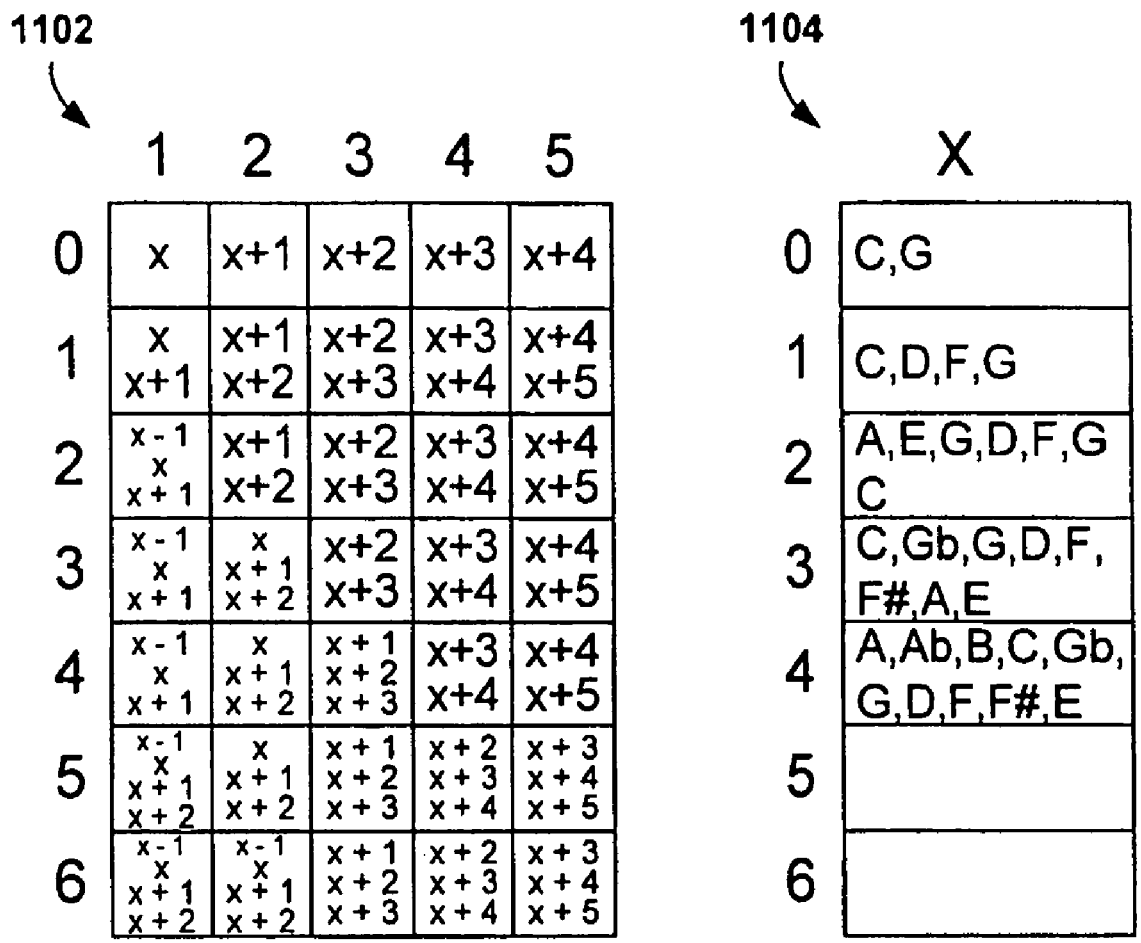
FIG. 11 shows several tables that specify hand and finger position filtering.

FIG. 11 shows several tables that specify hand and finger position filtering carried out as part of technique filtering that may be implemented in an embodiment of system component 120. In table 1102, each column corresponds to a finger, each row corresponds to a skill-level, and each cell indicates the notes, starting from a specified note "X," that can be played by a particular finger. Table 1102 thus species potential finger positions, at each of a number of skill-levels, for a particular hand position represented by the identity of note "X." Table 1104 specifies hand positions possible at each of numerous skill-levels. In Table 1104, each row corresponds to a skill-level, and each cell indicates the different note values for the reference note "X" in table 1102. Tables 1102 and 1104 together specify hand and fingering positions for each skill-level. For instruments in which both hands are used for playing, the system maintains a two pairs of tables 1102 and 1104, one pair for each hand. The system can alter a musical selection to correspond to the hand and finger positions appropriate for a selected skill-level in many different ways. First, fingering and hand position indications can be introduced into the musical selection that meet the specified skill-level, according to the tables, or existing fingering and hand positions can be altered to conform to the specified skill-level. Additionally, where necessary, musical notes may be altered or omitted, to avoid requiring hand positions and fingerings not allowed for a particular skill-level. Key-signature changes may be used to avoid excessive note alteration or omission. Additional skill-level parameterization may also be used. For example, a skill-level may be associated with a maximum number of hand positions, or with a maximum frequency of hand-position changes, or both.

Hand positions are determined by assigning each finger a unique key to strike. The procedure is described here in terms of musical keyboard instruments; the principles can be extrapolated to other instruments. The procedure ranks all permutations produced by generating, exhaustively, subsets of five unique pitches (one per finger) from a larger superset. The superset is limited by the instrument to be played, and the size of the user's hand. For example, in the case of a standard-sized musical keyboard and the average adult hand, the average limit is a major ninth, encompassing 15 unique pitches. In this case, all permutations produced by exhaustive generation of subsets of five unique pitches from a superset of fifteen are ranked according to the following criteria: (a) Range; (b) Step-wise or Skip-wise; (c) Diatonic or Non-diatonic; (d)

Chromatic or Non-Chromatic; (e) Number of black keys; (f) Position of black keys. Upon identification and ranking of all hand positions required in a selected composition, the procedure can be used to filter, or mark for adjustment, those positions exceeding the limits of user skill-level.

In one embodiment, Range(R) is defined as the musical interval from $1^{st}$ to $5^{th}$ finger. A single octave contains twelve unique pitches. Traditional music notation represents these twelve pitches with seven unique note names (C,D,E,F,G,A,B) used with or without flats or sharps (♭; ♯). Thus the twelve unique pitches are represented as unaltered and/or chromatically altered variants of the seven unique note names. A range can encompass any number of notes from a min to a max where $\{min,max\}=\{2,13\}$; ♯ of notes=1 is a singularity (unison) and hence ignored. For purposes of demonstration, 13 is also ignored, since an octave includes a repeat of the first note. Therefore, in the following description, the total number of range definitions=max−min+1=12. It should be noted, however, that the range of the human hand varies considerably per user and instrument. The procedure and principles can be extrapolated to any range. Range can also be described in terms of a musical interval of ½ semitones, where n ½ semitones=n+1 notes. The following ranges are defined:

(R0(unison)=Encompasses 1 note=0½ semitones));
R1(minor $2^{nd}$)=Encompasses 2 notes=1½ semitones;
R2(major $2^{nd}$)=Encompasses 3 notes=2½ semitones;
R3(augmented $2^{nd}$)=Encompasses 4 notes=3½ semitones;
R4(minor $3^{rd}$)=Encompasses 4 notes=3½ semitones;
R5(major $3^{rd}$)=Encompasses 5 notes=4½ semitones;
R6(dimished $4^{th}$)=Encompasses 5 notes=4½ semitones;
R7(perfect $4^{th}$)=Encompasses 6 notes=5½ semitones;
R8(augmented $4^{th}$)=Encompasses 6 notes=6½ semitones;
R9(diminished $5^{th}$)=Encompasses 6 notes=6½ semitones;
R10(perfect $5^{th}$)=Encompasses 8 notes=7½ semitones;
R11(diminished $6^{th}$)=Encompasses 8 notes=7½ semitones;
R12(augmented $5^{th}$)=Encompasses 9 notes=8½ semitones;
R13(minor $6^{th}$)=Encompasses 9 notes=8½ semitones;
R14(major $6^{th}$)=Encompasses 10 notes=9½ semitones;
R15(diminished $7^{th}$)=Encompasses 10 notes=9½ semitones;
R16(augmented $6^{th}$)=Encompasses 11 notes=10½ semitones;
R17(minor $7^{th}$)=Encompasses 11 notes=10½ semitones;
R18(major $7^{th}$)=Encompasses 12 notes=11½ semitones;
R19(octave)=Encompasses 13 notes=12½ semitones.

The enharmonic pairs R3/R4; R5/R6; R8/R9; R10/R11; R12/R13; R14/R15 and R16/R17 are redundant in terms of pitch, but are stated independently due to prevalent musical nomenclature. Other redundant spellings are ruled out or grouped within advanced hand positions. RO is a singularity (unison) and hence ignored.

In the following discussion, consecutive and non-consecutive note pairs are defined as those formed by exhaustive pairing of all member tones in a given hand position. In the present embodiment, a Step-wise (SW) hand position is defined as one that contains intervals less than or equal to a major second (2½ semitones) between consecutive tones. (Refer to R2 in the Range section.) A Skip-wise (SK) hand position contains one or more intervals≧R3. In the present embodiment, a Chromatic(C) hand position is defined as one that contains one or more chromatic progressions. A chromatic progression is defined as one that comprises 2 or more consecutive semitones. Non-Chromatic(NC) hand positions contain no chromatic progressions. Diatonic hand positions are defined as non-chromatic hand positions whose consecutive and/or non-consecutive note pairs do not form augmented or diminished intervals (R3; R6; R11; R12; R15; R16). For example, C, C♯, D, E, F♯ is non-diatonic. It contains a chromatic progression between note pair 1-2 and 2-3. C, D♭, E, F, G is non-diatonic. The interval between $2^{nd}$ and $3^{rd}$ tone is R3 (augmented second—3½ semitones). The number of black keys required by a hand position is a factor in assessing its skill level. In general, easier hand positions require fewer black keys. The starting position is defined as the key or note to which the first finger is assigned. Within a given hand position, the relative position of the black keys (which fingers are assigned black keys) affects the skill level of the hand position. For example, basic hand positions do not assign black keys assigned to the $1^{st}$ or $5^{th}$ fingers, and a black key assigned to the third finger is easier than one assigned to the fourth finger, given the natural curvature of the hand, and typical relative finger strength. The following is a generalized process description for generating and ranking hand positions.

(1) Assign numbers to fingers. For keyboard instruments fingers are numbered 1-5 in left and right hands. Thumb=1; index=2; middle=3; ring=4; small=5.

(2) For a given range R, in one hand, N notes are available. The notes of the progression are numerically ordered, substituting the note name with a number. Given the fingers are numbered from 1-5, not all N notes can be potential start notes, but notes N=1 to N-5+1 can be potential start notes. The code for the generation of all permutations of 5 finger hand position is shown in FIG. 22. The parameter max refers to the total number of notes encompassing a given range. For example, a perfect $5^{th}$ encompasses 8 notes, therefore N=8 notes are available. In this case only the $1^{st}$ to $4^{th}$ (8−5+1=4) can be potential starting notes. This also determines that the superset of finger positions in either hand comprises 56 variants, as shown in FIG. 23. FIG. 23 shows the numerical output for the above code, for a range of perfect fifth (encompassing 8 pitches). The top number in each column corresponds to the start position (first finger, either hand).

(3) Select start location which can be any 1 of the N-5+1 unique notes of the N notes encompassing the range.

(4) For the selected range (R) and start location different finger position clusters are created based on the application of the following filters in the following suggested order. (a) FP_1 {0BK,1BK,2BK,3BK} where (BK=black keys): Step-wise; Diatonic; Non-Chromatic; ♯ of Black Keys ={0, 1,2,3 }. For black keys >0, all possible hand positions with consecutive fingers separated by an interval of ½semitones are computed. Hand positions clusters are partitioned based on the position of a ½semitone, with respect to a black key. There are two basic partitions governed by whether or not a black key is implicated in a semitone. For example, consider there is BK=1(only one black key) in a particular set of variants of a hand position and this black key is at finger =3; Now consider three variants of this hand position, with BK=1 at finger 3 and there is a ½semitone between fingers (i.) 2&3 in one case; (ii.) 3&4 in the $2^{nd}$ case; (iii.) 4&5 in the $3^{rd}$ case. Then positions (i.) and (ii.) will be clustered together. FIG. 24 shows hand positions with one to four black keys grouped and ranked according to the position of the black keys and surrounding semitones. (b) FP_2. Step-wise; Diatonic; Chromatic; ♯ of Black Keys ={0,1,2,3}. For Black keys >0, hand position clusters are partitioned based on the position of a ½semitone with respect to a black key. (c) FP_3. Step-wise; NonDiatonic; Non-Chromatic; ♯ of BlackKeys ={0, 1,2,3 }. For Black keys>0, hand position clusters are partitioned based on the position of a ½semitone with respect to a black key. (d) FP__4. Stepwise; NonDiatonic; Chromatic; ♯ of BlackKeys ={0, 1,2, 3}. For Black keys >0, hand position clusters are partitioned based on the position of a ½semitone with respect to a black key.

(5) For a given range iterate through all possible N-5+1 start locations and repeat step 4 for each start location.

(6) Iterate through every range from R5 through R19, and iterate through steps 3-4.

The finger position clusters FP__1 . . . 4 are summarized in FIG. 25. FIG. 26 shows sample feature groups for increasing technical challenge. FIGS. 27 through 29 show sample pitch permutations ranked in order of increasing difficulty.

Although the present invention has been described in terms of a particular embodiment, it is not intended that the invention be limited to this embodiment. Modifications within the spirit of the invention will be apparent to those skilled in the art. For example, many other different filters associated with musical elements may be used. Pitch range filters may transpose extremely low-frequency or high-frequency notes by octaves in order to bring all notes within a specified maximum pitch range about a reference pitch for a particular instrument. Additional note speed and note density filters may be employed to filter notes with real-time durations shorter than a smallest duration allowed at a specified skill-level. When too many notes are specified within any measure for a particular skill-level, notes may be eliminated by a note-density filter. Additional technique filters can be employed, including duration of blowing, breath-taking intervals, force of striking or plucking the instrument, etc. The musical-election-variation-generation techniques and systems encompassed by the present invention can be applied in an almost limitless number of different computerized musical systems, implemented in any of many different programming languages on any of many different hardware platforms, using an almost limitless number of different control structures, modular organizations, argument types, variable types and numbers, and other programming parameters and implementation characteristics and styles.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A computer implemented method:
receiving a musical composition having an associated key signature and rhythm;
specifying a skill-level;
applying a key-signature filter and a note-speed filter to the musical composition to generate a variation of the musical composition with a new key-signature and a different rhythm that depend upon the selected skill level.

2. The computer implemented method as recited in claim 1, further comprising applying a rhythmic symbol filter to the musical composition such that the variation of the musical composition includes a reduced number of notation symbols.

3. The computer implemented method as recited in claim 1, wherein the key-signature and the note-speed filter are iteratively applied to each of a plurality of layers to generate the variation of the musical composition.

4. The computer implemented method as recited in claim 1, further comprising applying a hand/finger position filter to the musical composition such that the variation of the musical composition requires a fewer number of hand/finger positions.

5. The computer implemented method as recited in claim 1, further comprising applying a hand/finger position filter to the musical composition such that the variation of the musical composition requires fewer hand-position changes.

6. The computer implemented method as recited in claim 1, wherein the key-signature filter and the note-speed filter is applied to each of a plurality of layers of the musical composition.

7. The computer implemented method as recited in claim 6, wherein the plurality of layers include a melody line layer, a chord layer, and a bass line layer.

8. A tangible storage medium storing program instructions, wherein the program instructions are computer executable to:
receive a musical composition having an associated key signature and rhythm;
receive a selected skill-level from a user; and
apply a key-signature filter and a note-speed filter to the musical composition to generate a variation of the musical composition with a new key-signature and a different rhythm that depend upon the selected skill level.

9. The storage medium as recited in claim 8, wherein the instructions are further computer executable to:
apply a rhythmic symbol filter to the musical composition such that the variation of the musical composition includes a reduced number of notation symbols.

10. The storage medium as recited in claim 8, wherein the key-signature and the note-speed filter are iteratively applied to each of a plurality of layers to generate the variation of the musical composition.

11. The storage medium as recited in claim 8, wherein the instructions are further computer executable to:
apply a hand/finger position filter to the musical composition such that the variation of the musical composition requires a fewer number of hand/finger positions.

12. The storage medium as recited in claim 8, wherein the instructions are further computer executable to:
apply a hand/finger position filter to the musical composition such that the variation of the musical composition requires fewer hand-position changes.

13. The storage medium as recited in claim 8, wherein the key-signature filter and the note-speed filter is applied to each of a plurality of layers of the musical composition.

14. The storage medium as recited in claim 13, wherein the plurality of layers include a melody line layer, a chord layer, and a bass line layer.

15. The storage medium as recited in claim 8, wherein the key-signature filter utilizes a circle of fifths algorithm to select the new key-signature depending upon the selected skill level.

16. A musical system comprising:
a processor; and
a storage medium storing program instructions executable by the processor to:
- receive a musical composition having an associated key signature and rhythm;
- receive a selected skill-level from a user; and
- apply a key-signature filter and a note-speed filter to the musical composition to generate a variation of the musical composition with a new key-signature and a different rhythm that depend upon the selected skill level.

17. The musical system as recited in claim 16, wherein the instructions are further executable to:
apply a rhythmic symbol filter to the musical composition such that the variation of the musical composition includes a reduced number of notation symbols.

18. The musical system as recited in claim 16, wherein the instructions are executable to iteratively apply the key-signature and the note-speed filter to each of a plurality of layers to generate the variation of the musical composition.

19. The musical system as recited in claim 16, wherein the instructions are further executable to:
apply a hand/finger position filter to the musical composition such that the variation of the musical composition requires a fewer number of hand/finger positions.

20. The musical system as recited in claim 16, wherein the instructions are further executable to:
apply a hand/finger position filter to the musical composition such that the variation of the musical composition requires fewer hand-position changes.

21. The musical system as recited in claim 16, wherein the key-signature filter and the note-speed filter is applied to each of a plurality of layers of the musical composition.

22. The musical system as recited in claim 21, wherein the plurality of layers include a melody line layer, a chord layer, and a bass line layer.

* * * * *